(12) United States Patent  (10) Patent No.: US 8,761,269 B2
Hashimoto et al.  (45) Date of Patent: Jun. 24, 2014

(54) ISOLATED COMMUNICATION SYSTEM, AND TRANSMISSION UNIT AND RECEIVING UNIT APPLIED TO ISOLATED COMMUNICATION SYSTEM

(75) Inventors: Takao Hashimoto, Osaka (JP); Naoyuki Nakamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 318 days.

(21) Appl. No.: 13/104,492

(22) Filed: May 10, 2011

(65) Prior Publication Data

US 2011/0280323 A1 Nov. 17, 2011

(30) Foreign Application Priority Data

May 11, 2010 (JP) ................................. 2010-108945

(51) Int. Cl.
*H04B 3/02* (2006.01)
(52) U.S. Cl.
USPC .......................................................... 375/257
(58) Field of Classification Search
USPC ......... 375/219–222, 257, 258, 260, 262, 265; 370/278, 282; 455/69, 70, 71
See application file for complete search history.

(56) References Cited

U.S. PATENT DOCUMENTS

| 5,530,367 | A | * | 6/1996 | Bottman ........................ 324/616 |
| 5,568,474 | A | * | 10/1996 | Wissman ........................ 370/294 |
| 5,952,849 | A |   | 9/1999 | Haigh |
| 6,262,600 | B1 |   | 7/2001 | Haigh et al. |
| 6,356,584 | B1 |   | 3/2002 | Cuylen |
| 6,525,566 | B2 |   | 2/2003 | Haigh et al. |
| 6,903,578 | B2 |   | 6/2005 | Haigh et al. |
| 6,922,080 | B2 |   | 7/2005 | Haigh et al. |
| 7,075,329 | B2 |   | 7/2006 | Chen et al. |
| 7,535,296 | B2 | * | 5/2009 | Bulkes et al. ................... 330/10 |
| 7,701,731 | B2 |   | 4/2010 | Dhuyvetter et al. |
| 2005/0088227 | A1 | * | 4/2005 | Sakata ........................... 330/10 |

FOREIGN PATENT DOCUMENTS

| JP | 01-248729 A | 10/1989 |
| JP | 2001-513276 | 8/2001 |
| JP | 2003-523147 | 7/2003 |

* cited by examiner

*Primary Examiner* — Young T. Tse
(74) *Attorney, Agent, or Firm* — McDermott Will & Emery LLP

(57) ABSTRACT

A receiving unit converts a pulse received from a transmission unit into a digital output signal and send back the received pulse to the transmission unit via an isolated communication unit, when it receives the pulse transmitted from the transmission unit; the transmission unit includes: an edge pulse generating circuit for generating a pulse corresponding to a transition of the digital input signal between a first level and a second level; and a verification circuit configured to receive the pulse sent back from the receiving unit, determine whether or not the pulse has been sent back from the receiving unit, and generate an additional pulse when the verification circuit determines that the pulse has not been sent back from the receiving unit and is configured to transmit the pulses generated in the edge pulse generating circuit and in the verification circuit, to the receiving unit, via the isolated communication unit.

12 Claims, 13 Drawing Sheets

ISOLATED COMMUNICATION SYSTEM, AND TRANSMISSION UNIT AND RECEIVING UNIT APPLIED TO ISOLATED COMMUNICATION SYSTEM

CROSS REFERENCE TO RELATED APPLICATION

The disclosure of Japanese Patent Application No. 2010-108945 filed on May 11, 2010 including specification, drawings and claims is incorporated herein by reference in its entirety.

BACKGROUND OF THE INVENTION

1. Field of the Invention

The present invention relates to an isolated communication system which transmits a digital input signal from a transmission unit to a receiving unit isolated from the transmission unit, and a transmission unit and a receiving unit which are applied to the isolated communication system.

2. Description of the Related Art

In regard to a device such as a switching power supply, or a motor driving device, which includes a high-voltage/high-current driving section such as a power device and a relatively low-voltage/low-current control section such as a controller for controlling (inverter controlling) of the driving section, there is known a configuration in which the driving section and the control section which have different breakdown voltages are electrically isolated from each other and transmission and reception of signals between the control section and the driving section are performed by isolated communication to prevent the control section from being broken down or operating abnormally due to high voltages and high currents used in the driving section. In such a device, the isolated communication between the control section and the driving section is performed in such a manner that a digital input signal input to a transmission unit of the control section is, after its conversion into a pulse signal, transmitted to a receiving unit of the driving section. In this communication, if some transmission errors occur due to disturbance or the like in a transmission path used for such isolated communication, it becomes unable to transmit correct signals. For example, in a case where pulses are generated according to detection of a rising and a falling of a digital input signal, if it cannot be identified correctly whether a pulse to be detected in the receiving unit is the rising or the falling of the digital input signal, decoding into a correct digital output signal in the receiving unit becomes impossible.

For the purpose of preventing such transmission errors, redundant signal lines or bits for correcting errors are generally added in digital communications or the like. This is not preferable, because its structure will become complicated and its cost will increase. Besides, there are increases in delay time and power consumption. In particular, if there is an increase in delay time, it becomes impossible to increase a frequency of switching. Therefore, performance of the device (for example, performance of power conversion) would be degraded significantly.

Also, there is known a configuration in which pulses respectively corresponding to a rising and a falling of a transmission signal are transmitted in different forms (for example, see U.S. Pat. No. 7,075,329 and JP-T-2001-513276). In U.S. Pat. No. 7,075,329, a pulse corresponding to a rising is a positive pulse while a pulse corresponding to a falling is a negative pulse. In JP-T-2001-513276, a single pulse is generated in correspondence to a falling while two pulses are generated in correspondence to a rising. Furthermore, there is known a configuration in which a pulse corresponding to a rising and a pulse corresponding to a falling are separately transmitted using different isolated communication paths (for example, see JP-T-2003-523147).

SUMMARY OF THE INVENTION

However, in a configuration disclosed in U.S. Pat. No. 7,075,329, each circuitry in the transmission and receiving units becomes complicated. In addition, if in a configuration disclosed in JP-T-2001-513276, the number of pulses detected in the receiving unit varies due to disturbance or the like, correct decoding cannot be carried out, which makes it difficult to accomplish highly-accurate signal transmission. Furthermore, in the configuration disclosed in JP-T-2003-523147, it is possible to detect a transmission error, but impossible to conduct an error correction.

The present invention has been developed under the circumstances, and an object of the present invention is to provide an isolated communication system capable of performing high-accuracy isolated communication with a simple configuration, and to provide a transmission unit and a receiving unit which are applicable to the isolated communication system.

According to the present invention, an isolated communication system comprises a transmission unit; a receiving unit isolated from the transmission unit; and an isolated communication unit which provides isolation between the transmission unit and the receiving unit and transmits signals between the transmission unit and the receiving unit, in which the transmission unit converts a digital input signal which transitions between a first level and a second level different from the first level into a pulse and transmits the pulse to the receiving unit via the isolated communication unit; the receiving unit being configured to convert the pulse received from the transmission unit into a digital output signal and send back the received pulse to the transmission unit via the isolated communication unit, when the receiving unit receives the pulse transmitted from the transmission unit; the transmission unit including: an edge pulse generating circuit for generating a pulse corresponding to a transition of the digital input signal between the first level and the second level; and a verification circuit configured to receive the pulse sent back from the receiving unit, determine whether or not the pulse has been sent back from the receiving unit, and generate an additional pulse when the verification circuit determines that the pulse has not been sent back from the receiving unit; and the transmission unit being configured to transmit the pulse generated in the edge pulse generating circuit and the additional pulse generated in the verification circuit, to the receiving unit, via the isolated communication unit.

In accordance with the isolated communication system having the above configuration, the pulse generated according to the transition of the digital input signal is transmitted from the transmission unit to the receiving unit via the isolated communication unit, and the pulse received in the receiving unit is sent back to the transmission unit via the isolated communication unit. The verification circuit of the transmission unit determines whether or not the pulse has been sent back from the receiving unit. If the verification circuit determines that the pulse has not been sent back from the receiving unit, the transmission unit transmits a new pulse (additional pulse) to the receiving unit to make up for a lack of pulse. Since the pulse transmitted to the receiving unit is sent back to the transmission unit as described above, it is possible to confirm whether or not the pulse has been transmitted to the receiving unit correctly and to make up for a lack of pulse if it is determined that the pulse has not been transmitted to the receiving unit correctly. Therefore, it is possible to decode the digital input signal in the receiving unit with high accuracy. As a result, highly-accurate isolated communication can be performed with a simple configuration.

The transmission unit may include a transmission-side transmitting circuit placed in a signal-transmissible state with an output of the edge pulse generating circuit and an output of the verification circuit being connected to the isolated communication unit, when the transmission-side transmitting circuit detects the pulse generated in the edge pulse generating circuit and the additional pulse generated in the verification circuit, and placed in a signal-receivable state with an input of the verification circuit being connected to the isolated communication unit, when the transmission-side transmitting circuit does not detect the pulse generated in the edge pulse generating circuit and the additional pulse generated in the verification circuit: and the receiving unit may include a receiving-side transmitting circuit placed from a signal-receivable state in which the receiving-side transmitting circuit receives the pulse from the transmission unit to a signal-transmissible state in which the receiving-side transmitting circuit sends back the received pulse to the transmission unit via the isolated communication unit, when the receiving-side transmitting circuit detects the pulse transmitted from the transmission unit.

In accordance with this configuration, since the signal-transmissible state/signal-receivable state of the transmission unit can be switched based on the pulse generated in the transmission unit, a configuration of the transmission unit can be simplified. In the same manner, since the signal-transmissible state/signal-receivable state of the receiving unit can be switched based on the pulse received in the receiving unit, a configuration of the receiving unit can be simplified.

The verification circuit may include a charge trigger circuit for detecting the transition of the digital input signal and the pulse sent back from the receiving unit; a charge pump circuit which starts charging of the capacitor, when the charge trigger circuit detects the transition of the digital input signal, as a trigger, and starts discharging of the capacitor when the charge trigger circuit detects the pulse sent back from the receiving unit, as a trigger; and an additional pulse generating circuit for generating an additional pulse when a voltage of the capacitor reaches a predetermined threshold voltage or more, by the charging of the capacitor by the charge pump circuit.

In accordance with this configuration, the capacitor of the charge pump circuit is charged when the charge trigger circuit detects the transition of the digital input signal, as a trigger, and the additional pulse is generated when the voltage of the capacitor reaches the predetermined threshold voltage or more. Therefore, with a simple configuration, it can be determined whether or not the pulse has been sent back from the receiving unit within a time period from when charging of the capacitor of the charge pump circuit starts until the voltage of the capacitor reaches the threshold voltage or more, and the additional pulse can be generated if it is determined that the pulse has not been sent back from the receiving unit.

The verification circuit may include a counter circuit which starts counting when the verification circuit detects the transition of the digital input signal, as a trigger, and resets a number counted by the counter circuit, when the verification circuit detects the pulse sent back from the receiving unit; and an additional pulse generating circuit for generating an additional pulse when the counter circuit counts a predetermined number or more.

In accordance with this configuration, the counter circuit starts counting when the verification circuit detects the transition of the digital input signal, as a trigger, and the additional pulse is generated when the number counted by the counter circuit reaches the predetermined number or more. Therefore, with a simple configuration, it can be determined whether or not the pulse has been sent back from the receiving unit within a time period from when the counter circuit starts counting until the counted number reaches a predetermined number or more, and the additional pulse can be generated if it is determined that the pulse has not been sent back from the receiving unit.

The edge pulse generating circuit may include a first pulse generating circuit for generating a first pulse corresponding to a transition of the digital input signal from the first level to the second level and a second pulse generating circuit for generating a second pulse corresponding to a transition of the digital input signal from the second level to the first level; the isolated communication unit may include a first isolated communication unit for transmitting the first pulse generated in the first pulse generating circuit to the receiving unit, and a second isolated communication unit for transmitting the second pulse generated in the second pulse generating circuit to the receiving unit; the transmission unit and the receiving unit may be configured in such a manner that the first pulse transmitted from the first pulse generating circuit to the receiving unit via the first isolated communication unit is sent back from the receiving unit to the transmission unit via the second isolated communication unit, and the second pulse transmitted from the second pulse generating circuit to the receiving unit via the second isolated communication unit is sent back from the receiving unit to the transmission unit via the first isolated communication unit; the verification circuit may include a first verification circuit which determines whether or not the first pulse has been sent back from the receiving unit via the second isolated communication unit and generates a first additional pulse when the first verification circuit determines that the first pulse has not been sent back from the receiving unit, and a second verification circuit which determines whether or not the second pulse has been sent back from the receiving unit via the first isolated communication unit and generates a second additional pulse when the second verification circuit determines that the second pulse has not been sent back from the receiving unit; and the transmission unit may be configured to transmit the first pulse generated in the first pulse generating circuit and the first additional pulse generated in the first verification circuit to the receiving unit via the first isolated communication unit, and transmit the second pulse generated in the second pulse generating circuit and the second additional pulse generated in the second verification circuit to the receiving unit via the second isolated communication unit.

In accordance with this configuration, the transmission unit distinguishes the transition of the digital input signal, between the transition from the first level to the second level and the transition from the second level to the first level, and transmits the first pulse and the second pulse corresponding to respective transitions, to the receiving unit, using the corresponding isolated communication units, respectively. The first and second pulses received in the receiving unit are sent back from the receiving unit using the isolated communication units, respectively, which are different from the isolated communication units used to transmit the first and second pulses to the receiving unit, respectively. Since the first and second pulses are sent back using the isolated communication units, respectively, which are different from the isolated communication units used to transmit the first and second pulses, respectively, it is not necessary to switch the transmission unit from a signal-transmissible state to a signal-receivable state just after the transmission unit has transmitted the pulse, and to switch the receiving unit from a signal-receivable state to a signal-transmissible state, just after the receiving unit has received the pulse. Thus, a higher-speed verifying operation is achieved. In addition, the first and second pulses corresponding to respective transitions, are transmitted using different isolated communication units, it is possible to surely decode the digital input signal in the receiving unit.

A transmission unit of the present invention is a transmission unit applied to an isolated communication system including: the transmission unit; a receiving unit isolated from the transmission unit; and an isolated communication unit which provides isolation between the transmission unit and the receiving unit and transmits signals between the transmission unit and the receiving unit, in which the transmission unit converts a digital input signal which transitions between a first level and a second level different from the first level into a pulse and transmits the pulse to the receiving unit via the isolated communication unit, comprises an edge pulse generating circuit for generating a pulse corresponding to a transition of the digital input signal between the first level and the second level; and a verification circuit configured to receive the pulse sent back from the receiving unit, determine whether or not the pulse has been sent back from the receiving unit, and generate an additional pulse when the verification circuit determines that the pulse has not been sent back from the receiving unit; and the transmission unit being configured to transmit the pulse generated in the edge pulse generating circuit and the additional pulse generated in the verification circuit, to the receiving unit, via the isolated communication unit.

In accordance with the transmission unit having the above configuration, the transmission unit transmits the pulse generated according to the transition of the digital input signal to the receiving unit. The verification circuit of the transmission unit determines whether or not the pulse has been sent back from the receiving unit. If the verification circuit determines that the pulse has not been sent back from the receiving unit, the transmission unit transmits a new pulse (additional pulse) to the receiving unit to make up for a lack of pulse. Since the verification circuit determines whether or not the pulse has been sent back from the receiving unit to the transmission unit, it is possible to confirm whether or not the pulse has been transmitted to the receiving unit correctly and to make up for a lack of pulse if it is determined that the pulse has not been transmitted to the receiving unit correctly. Therefore, it is possible to decode the digital input signal in the receiving unit with high accuracy. As a result, highly-accurate isolated communication can be performed with a simple configuration.

A receiving unit of the present invention is a receiving unit applied to an isolated communication system including: a transmission unit; the receiving unit isolated from the transmission unit; and an isolated communication unit which provides isolation between the transmission unit and the receiving unit and transmits signals between the transmission unit and the receiving unit, in which in which the transmission unit converts a digital input signal which transitions between a first level and a second level different from the first level into a pulse and transmits the pulse to the receiving unit via the isolated communication unit; the receiving unit being configured to convert the pulse received from the transmission unit into a digital output signal and send back the received pulse to the transmission unit via the isolated communication unit, when the receiving unit receives the pulse transmitted from the transmission unit.

In accordance with the receiving unit having the above configuration, the pulse transmitted from the transmission unit to the receiving unit via the isolated communication unit is converted into the digital output signal, and the received pulse is sent back to the transmission unit via the isolated communication unit. Since the pulse transmitted to the receiving unit is sent back from the receiving unit to the transmission unit, it is possible to decode the digital input signal in the receiving unit with high accuracy. As a result, highly-accurate isolated communication can be performed with a simple configuration.

The present invention has the above described configuration and has advantages that highly-accurate isolated communication can be performed with a simple configuration.

The above and further objects and features of the invention will more fully be apparent from the following detailed description with accompanying drawings.

DETAILED DESCRIPTION OF THE PREFERRED EMBODIMENT

Hereinafter, preferred embodiments of the present invention will be described with reference to the drawings. Throughout the drawings, the same or corresponding constituents are designated by the same reference symbols and will not be described respectively.

Embodiment 1

Figure 1:
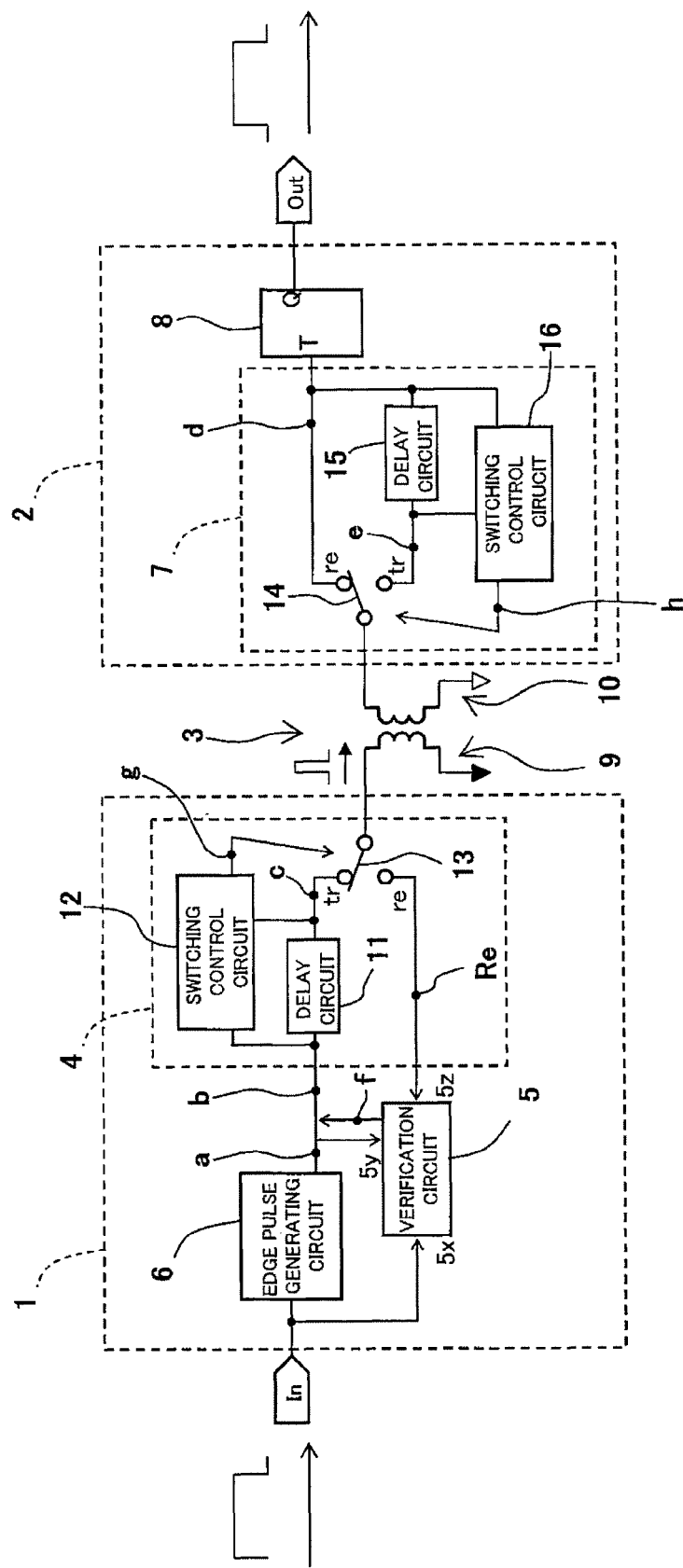
FIG. 1 is a circuit diagram showing a schematic configuration of an isolated communication system according to Embodiment 1 of the present invention.
Figure 2:
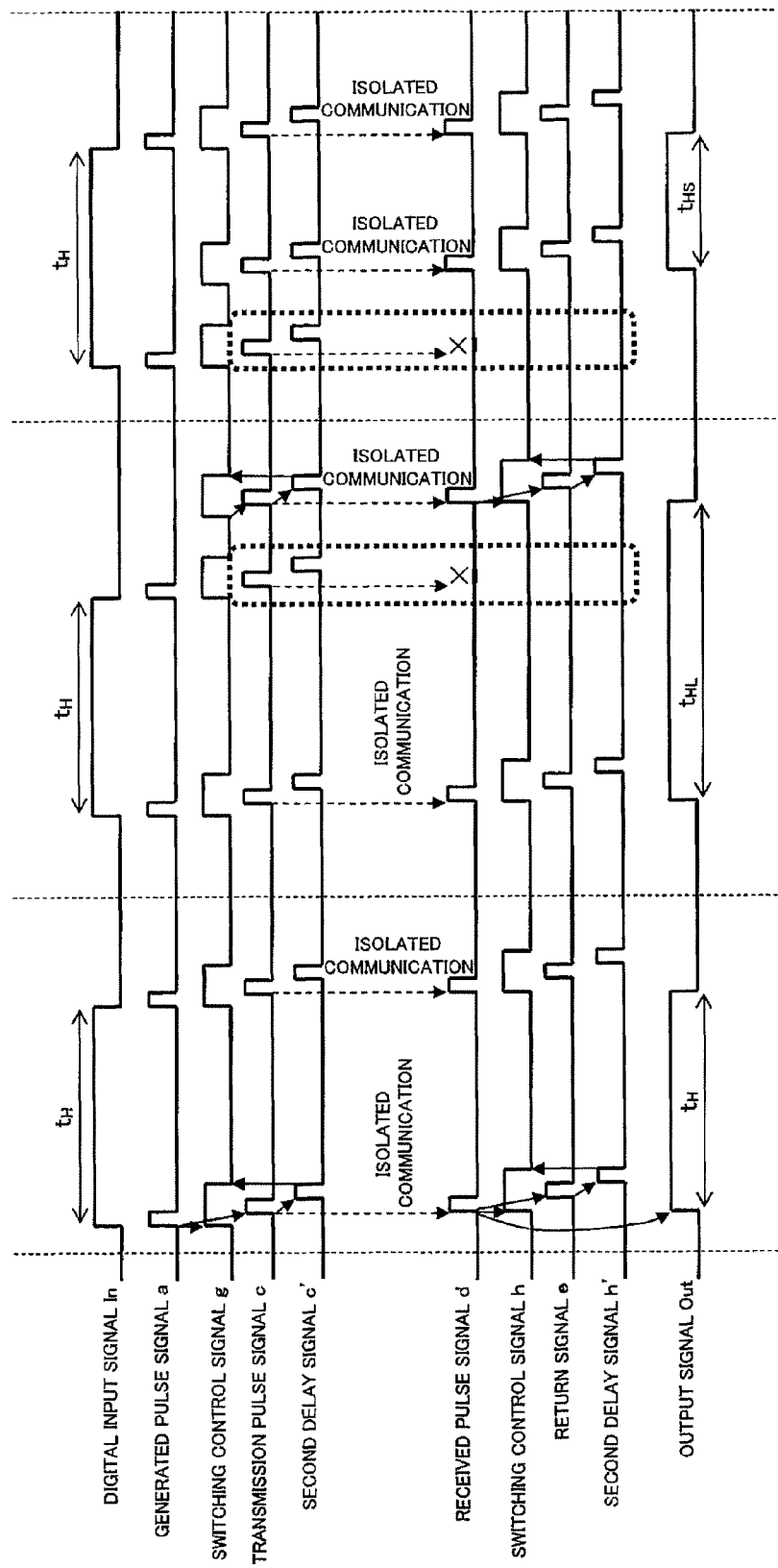
FIG. 2 is a graph showing waveforms of signals, respectively, in sections of the isolated communication system of FIG. 1.

Firstly, an isolated communication system according to Embodiment 1 of the present invention will be described with reference to the drawings. FIG. 1 is a circuit diagram showing a schematic configuration of an isolated communication system according to Embodiment 1 of the present invention. FIG. 2 is a graph showing waveforms of signals, respectively, in sections of the isolated communication system of FIG. 1.

Referring to FIG. 1, the isolated communication system of the present invention includes a transmission unit 1, a receiving unit 2 which is isolated from the transmission unit 1, and an isolated communication unit 3 which performs isolated communication by transmission/reception of the pulses between the transmission unit 1 and the receiving unit 2. The isolated communication unit 3 has a transmission section 9 to which the transmission unit 1 is connected and a receiving section 10 to which the receiving unit 2 is connected, and is configured such that the transmission section 9 and the receiving section 10 are isolatedly communicable. More specifically, coils are disposed in a mutually inductive relation, in the transmission section 9 and the receiving section 10, respectively. Each of the coils is grounded and the ground of the transmission section 9 and the ground of the receiving section 10 may be set at mutually different ground voltages.

Although in this embodiment, there is exemplarily shown a configuration that employs mutual induction coils as the isolated communication unit 3, such a configuration is merely exemplary, and other configuration capable of transmission and reception of the pulses, for example, a configuration using a photo coupler or a capacitor is also applicable.

As shown in FIG. 2, the transmission unit 1 is fed with a digital input signal In that transitions in signal level (voltage level) between a first level (for example, L level) and a second level (for example, H level higher in voltage than L level) different from the first level. It is assumed that a frequency of the digital input signal In ranges from several kHz to several hundreds kHz. The transmission unit 1 converts the digital input signal In into a pulse (pulse signal) and transmits the pulse to the receiving unit 2 via the isolated communication unit 3. To implement this, as shown in FIG. 1, the transmission unit 1 includes an edge pulse generating circuit 6 for generating a pulse corresponding to a transition of the digital input signal In between the first level L and the second level H.

To be more specific, the edge pulse generating circuit 6 generates a first pulse corresponding to a transition of the digital input signal In (in this embodiment, a rising from L level to H level, hereinafter this transition is referred to as a first transition) from the first level to the second level, or generates a second pulse corresponding to a transition (in this embodiment, a falling from H level to L level, hereinafter this transition is referred to as a second transition) from the second level to the first level (outputs a generated pulse signal a in FIG. 2). The edge pulse generating circuit 6 may have any configuration so long as it is capable of generating the pulse according to the transition of the digital input signal In.

The transmission unit 1 further includes a transmission-side transmitting circuit 4 for transmitting the pulse generated in the edge pulse generating circuit 6 and a pulse generated in a verification circuit 5 as described later to the receiving unit 2 via the isolated communication unit 3 (hereinafter these pulses are also referred to as transmitting circuit input signal b). In this embodiment, the transmission-side transmitting circuit 4 outputs a transmission pulse signal c which is generated by delaying a pulse cycle of the transmitting circuit input signal b input to the transmission-side transmitting circuit 4, for a predetermined time period.

The receiving unit 2 includes a receiving-side transmitting circuit 7 for receiving a pulse (received pulse signal d) received from the transmission unit 1 via the isolated communication unit 3. The receiving unit 2 further includes a decode circuit 8 for decoding the pulse (received pulse signal d) received in the receiving-side transmitting circuit 7 to generate a digital output signal Out.

The receiving-side transmitting circuit 7 of the receiving unit 2 is configured to send back the received pulse (transmits a return signal e based on the received pulse signal d) to the transmission unit 1 via the isolated communication unit 3, when the receiving-side transmitting circuit 7 receives the pulse transmitted from the transmission unit 1 to the receiving unit 2 via the isolated communication unit 3.

In correspondence with this, the transmission-side transmitting circuit 4 of the transmission unit 1 is configured to receive the pulse (received return signal Re) sent back from the receiving unit 2. The transmission unit 1 further includes the verification circuit 5 for determining whether or not the pulse has been sent back from the receiving unit 2. The verification circuit 5 is configured to generate an additional pulse (additional pulse signal f) if the verification circuit 5 determines that the pulse has not been sent back from the receiving unit 2.

In accordance with the isolated communication system having the above configuration, the transmission unit 1 transmits the pulse (generated pulse signal a) generated according to the transition of the digital input signal In to the receiving unit 2 via the isolated communication unit 3, while the receiving unit 2 sends back the received pulse as the return signal e to the transmission unit 1 via the isolated communication unit 3. The verification circuit 5 of the transmission unit 1 determines whether or not the pulse has been sent back from the receiving unit 2. If the verification circuit 5 determines that the pulse has not been sent back from the receiving unit 2, the verification circuit 5 generates a new pulse (additional pulse) and the transmission unit 1 transmits the new pulse or additional pulse to the receiving unit 2 to make up for a lack of pulse. Since the receiving unit 2 sends back the pulse transmitted from the transmission unit 1 to the receiving unit 2 in the above described manner, it is possible to confirm whether or not the pulse has been transmitted correctly from the transmission unit 1 to the receiving unit 2, and make up for a lack of the pulse if it is determined that the pulse has not been transmitted correctly from the transmission unit 1 to the receiving unit 2. Therefore, it is possible to decode the digital input signal In in the receiving unit 2 with high accuracy. Thus, highly-accurate isolated communication can be performed with a simple configuration.

In a case where the additional pulse is transmitted from the transmission unit 1 and the digital input signal In is decoded into the digital output signal Out in the receiving unit 2, as shown in FIG. 2, a period $t_H$ of the second level H of the digital output signal Out is different from a period $t_H$ of the second level H of the digital input signal In. For example, in a case where the additional pulse is transmitted when the second transition of the digital input signal In is decoded, the period $t_H$ of the second level H of the digital output signal Out is longer than the period $t_H$ of the second level H of the digital input signal In ($t_{HL} > t_H$). On the other hand, in a case where the additional pulse is transmitted when the first transition of the digital input signal In is decoded, the period $t_H$ of the second level H of the digital output signal Out generated by decoding is shorter than the period $t_H$ of the second level H of the digital input signal In ($t_{HS} < t_H$).

Although the digital output signal Out generated by decoding based on the additional pulse is, in some cases, varied with respect to the digital input signal In as described above, it is possible to perform proper control by setting a temporal margin for permitting the above time period difference to a switching timing of a switching circuit or the like included in a device (e.g., driving device) which is connected to the receiving unit 2 and is operative based on the digital output Out.

Hereinafter, a detailed configuration of the isolated communication system of this embodiment will be described. Upon detecting the pulse generated in the edge pulse generating circuit 6 and the pulse generated in the verification circuit 5, the transmission-side transmitting circuit 4 of the transmission unit 1 is placed in a signal-transmissible state with an output end tr of the edge pulse generating circuit 6 and the verification circuit 5 being connected to the transmission section 9 of the isolated communication unit 3. On the other hand, if the transmission-side transmitting circuit 4 does not detect the pulse generated in the edge pulse generating circuit 6 and the pulse generated in the verification circuit 5, the transmission-side transmitting circuit 4 of the transmission unit 1 is placed in a signal-receivable state with an input terminal re of the verification circuit 5 being connected to the transmission section 9 of the isolated communication unit 3.

To be more specific, the transmission-side transmitting circuit 4 includes a switch 13 for performing switching to connect the transmission section 9 of the isolated communication unit 3 either to the transmission end tr of the edge pulse generating circuit 6 or to the receiving end re of the verification circuit 5, a delay circuit 11 for delaying the pulse (transmitting circuit input signal b) input to the transmission-side transmitting circuit 4 for a predetermined time period, and a switching control circuit 12 for controlling a switching (selecting) operation of the switch 13 based on the pulse (transmitting circuit input signal b) input to the transmission-side transmitting circuit 4 and the output signal (transmission pulse signal c) of the delay circuit 11 so that the transmission section 9 is connected either to the transmission end tr and the receiving end re.

Likewise, the receiving-side transmitting circuit 7 of the receiving unit 2 is switched from a signal-receivable state in which the receiving-side transmitting circuit 7 can receive the pulse (received pulse signal d) to a signal-transmissible state in which the receiving-side transmitting circuit 7 can send back the received pulse (return signal e based on the received pulse) to the transmission unit 1 via the isolated communication unit 3, when it detects the pulse transmitted from the transmission unit 1.

To be more specific, the receiving-side transmitting circuit 7 of the receiving unit 2 includes a switch 14 for performing switching to connect the receiving section 10 of the isolated communication unit 3 either to a receiving end re of the pulse connected to an input terminal of the decode circuit 8 or to a transmission end tr of the return signal e, a delay circuit 15 for delaying the received pulse for a predetermined time period, and a switching control circuit 16 for controlling a switching (selecting) operation of the switch 14 based on the received pulse and the output signal of the delay circuit 15 so that the receiving section 10 is connected to either the transmission end tr or to the receiving end re.

In the above configuration, as shown in FIG. 2, the edge pulse generating circuit 6 of the transmission unit 1 detects the transition (rising or falling) of the digital signal In between the first level L and the second level H and thereby generates the pulse (generated pulse signal a) corresponding to the transition of the digital signal In. The generated pulse signal a is input to the delay circuit 11 of the transmission-side transmitting circuit 4 and to the switching control circuit 12 as the transmitting circuit input signal b.

Figure 3:
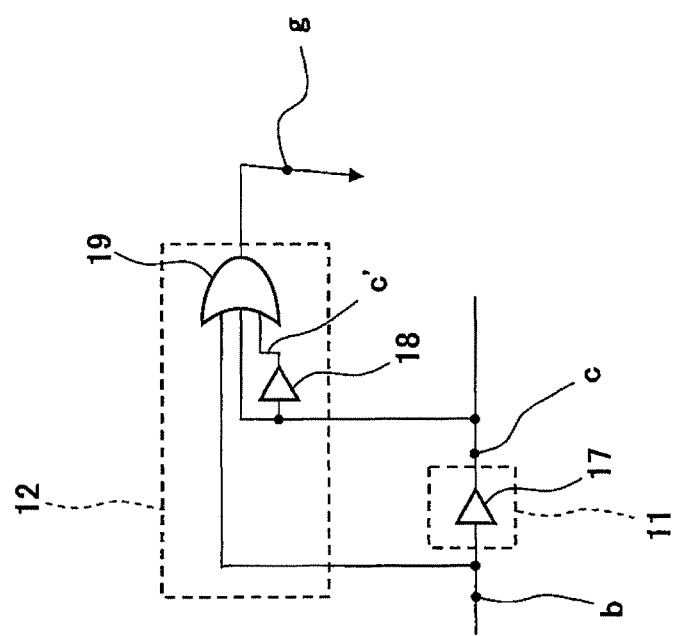
FIG. 3 is a circuit diagram showing a delay circuit and a switching control circuit in the isolated communication system of FIG. 1.

FIG. 3 is a circuit diagram showing the delay circuit and the switching control circuit in the isolated communication system of FIG. 1.

Referring to FIG. 3, in this embodiment, the delay circuit 11 includes a buffer circuit 17 for delaying the input pulse (transmitting circuit input signal b) for a predetermined time period. When the generated pulse signal a as the transmitting circuit input signal b is input to the delay circuit 11, the delay circuit 11 outputs a transmission pulse signal (first delay signal) c generated by delaying the transmitting circuit input signal b for the predetermined time period. In this embodiment, the switching control circuit 12 includes a buffer circuit 18 for delaying an output signal (transmission pulse signal c) of the delay circuit 11 for a predetermined time period, and a signal holding circuit (in this embodiment, OR circuit) 19 which is fed with the transmitting circuit input signal b, the output signal c of the delay circuit 11, and an output signal (second delay signal) c' of the buffer circuit 18, and outputs a pulse (transmission-side switching control signal g) held at the second level H for a time period from when the transmitting circuit input signal b has transitioned (risen) to the second level H until the output signal c' of the buffer circuit 18 has transitioned (fallen) to the first level L. The switch 13 is connected to the receiving end re for a time period when the output (transmission-side switching control signal g) of the signal holding circuit 19 is held at the first level L, and to the transmission end tr for a time period when the output of the signal holding circuit 13 is held at the second level H.

In the above configuration, when the pulse (transmitting circuit input signal b) is input to the switching control circuit 12, the switching control circuit 12 switches the switch 13 from a state where it is connected to the receiving end re to a state where it is connected to the transmission end tr. After accomplishing transmission of the transmission pulse signal c (transmission-side switching control signal g has fallen), the switching control circuit 12 re-switches the switch 13 to connect it to the receiving end re again.

The receiving-side transmitting circuit 7 of the receiving unit 2 has substantially the same configuration as that of the transmission-side transmitting circuit 4 of the transmission unit 1. To be specific, the delay circuit 15 outputs a return signal (first delay signal) e generated by delaying the input received pulse signal d for a predetermined time period. The switching control circuit 16 outputs a pulse (receiving-side switching control signal h) held at the second level H for a time period from when the input received pulse signal d has transitioned to the second level H until the output signal (second delay signal) h' of the buffer circuit 18 has transitioned to the first level L. The switch 14 is connected to the receiving end re for a time period during which the receiving-side switching control signal h is held at the first level L and connected to the transmission end tr for a time period during which the receiving-side switching control signal h is held at the second level H.

The switch 14 receives the pulse in a state where it is connected to the receiving end re. When the pulse (received pulse signal d) is input to the switching control circuit 16, the switching control circuit 16 switches the switch 14 from a state where it is connected to the receiving end re to a state where it is connected to the transmission end tr. After accomplishing transmission of the return signal e (after the receiving-side switching control signal h has fallen), the switching control circuit 16 re-switches the switch 14 to connect it to the receiving end re again.

As described above, when the transmission unit 1 transmits the transmission pulse signal c to the receiving unit 2, the switch 13 at the transmission-side is connected to the transmission end tr and the switch 14 at the receiving-side is connected to the receiving end re. When the receiving unit 2 transmits the return signal e to the transmission unit 1, the switch 14 at the receiving-side is connected to the transmission end tr and the switch 13 at the transmission-side is connected to the receiving end re.

In this embodiment, since the switch 13 is controlled based on the pulse (transmitting circuit input signal b) generated in the transmission unit 1 to switch the signal-transmissible state/signal-receivable state of the transmission unit 1, a configuration of the transmission unit 1 can be simplified. In the same manner, since the switch 14 is controlled based on the pulse (received pulse signal d) received in the receiving unit 2 to switch the signal-transmissible state/signal-receivable state of the receiving unit 2, a configuration of the receiving unit 2 can be simplified.

As described above, when the transmission unit 1 transmits the transmission pulse signal c, the receiving unit 2 can receive the received pulse signal d based on the transmission pulse signal c, while when the receiving unit 2 transmits the return signal e, the transmission unit 1 can receive the received return signal Re based on the return signal e.

Although in this embodiment, the switches 13 and 14 are respectively connected to the receiving ends re when the signals at the first level L are input to the switching control circuits 12 and 16, respectively, and are connected to the transmission ends tr, respectively when the input signals have transitioned to the second level H, the present invention is not limited to this. For example, the switches 13 and 14 may operate in association with each other in such a manner that when the switch 13 of the transmission unit 1 is connected to the transmission end tr, the switch 14 of the receiving unit 2 is connected to the receiving end re, while when the switch 13 of the transmission unit 1 is connected to the receiving end re, the switch 14 of the receiving unit 2 is connected to the transmission end tr. In a further alternative, controllers for controlling a switching operation of the switches 13 and 14 may be provided outside the transmission unit 1 and the receiving unit 2, respectively.

When the received pulse signal d is received in the receiving-side transmitting circuit 7 of the receiving unit 2, it is input to the decode circuit 8, which decodes the signal. In this embodiment, the decode circuit 8 is constituted by a T flip flop circuit which inverts a signal level of an input pulse (transitions the signal level) and outputs the inverted pulse from an output terminal Q, every time the pulse is input to an input terminal T.

The return signal e based on the received pulse signal d received in the receiving-side transmitting circuit 7 of the receiving unit 2 is sent back from the receiving-side transmitting circuit 7 of the receiving unit 2 to the transmission-side transmitting circuit 4 of the transmission unit 1 via the isolated communication unit 3. The received return signal Re received in the transmission-side transmitting circuit 4 is input to the verification circuit 5.

Figure 4:
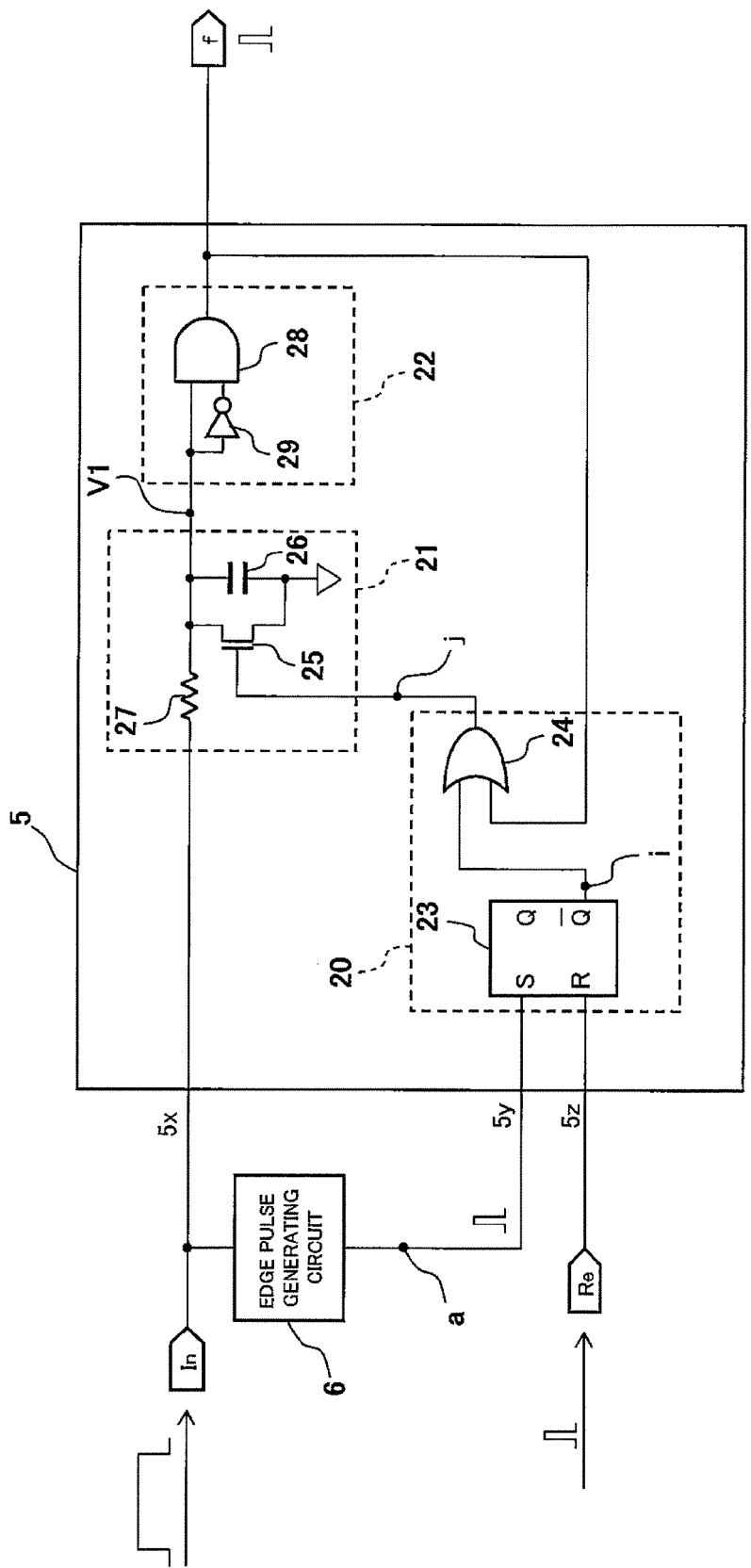
FIG. 4 is a circuit diagram showing an exemplary verification circuit in the isolated communication system of FIG. 1.

FIG. 4 is a circuit diagram showing an exemplary verification circuit in the isolated communication system of FIG. 1. Referring to FIG. 4, in this embodiment, the verification circuit 5 includes a charge trigger circuit 20 for detecting the transition of the digital input signal In and the pulse sent back from the receiving unit 2, and a charge pump circuit 21 which starts charging of a capacitor 26 when the charge trigger circuit 20 detects the transition of the digital input signal In, as a trigger, and starts discharging of the capacitor 26 when the charge trigger circuit 20 detects the pulse sent back from the receiving unit 2, as a trigger, and an additional pulse generating circuit 22 for generating an additional pulse when a voltage of the capacitor 26 reaches a threshold voltage Vth or more by the charging of the capacitor 26 by the charge pump circuit 21.

In this embodiment, the charge trigger circuit 20 includes a RS flip flop circuit 23 which alternately detects the generated pulse signal a output from the edge pulse generating circuit 6 and the received return signal Re and thereby outputs a signal whose signal level transitions repetitively, and an OR circuit 24 which is fed with an output signal (trigger signal j) of the RS flip flop circuit 23 and an output signal (i.e., additional pulse signal f) of the verification circuit 5. The RS flip flop circuit 23 is fed with the generated pulse signal a at a set input terminal S via an input terminal 5y of the verification circuit 5 and with the received return signal Re at a reset input terminal R via an input terminal 5z of the verification circuit 5. The RS flip flop circuit 23 outputs an inverted output as a flip flop output signal i to the OR circuit 24.

In this embodiment, the charge pump circuit 21 includes a capacitor 26 applied with a voltage according to a signal level of the digital input signal In input through an input terminal 5x of the verification circuit 5, a switching element 25 which allows both ends of the capacitor 26 to be short-circuited, and a resistor 27 which determines the voltage applied to the capacitor 26. The switching element 25 is constituted by, for example, a FET or the like. In this case, main terminals (source terminal and drain terminal) of the switching element 25 are connected to both ends of the capacitor 26, while a control terminal (gate terminal) of the switching element 25 is connected to an output of the OR circuit 24. Therefore, when the trigger signal j which is the output signal of the OR circuit 24 is at H level higher than L level, the switching element 25 is turned ON, thereby allowing the capacitor 26 to be discharged. On the other hand, when the trigger signal j is at L level, the switching element 25 is turned OFF, thereby allowing the capacitor 26 to be charged.

In this embodiment, the additional pulse generating circuit 22 includes an AND circuit 28 which is fed with a voltage (charge voltage) V1 (first input) applied to the capacitor 26 of the charge pump circuit 21 and an inverted output (second input) of the first input. To be specific, the additional pulse generating circuit 22 includes an inverting circuit 29 for inverting the charge voltage V1. It should be noted that the inverting circuit 29 serves as a buffer for holding the inverted state of the charge voltage V1 for a predetermined time period as well as inverting the charge voltage V1.

A time constant determined by the resistor 27 and the capacitor 26 is set so that the charge voltage V1 applied to charge the capacitor 26 for the predetermined time period becomes a voltage (threshold Vth) with which the AND circuit 28 transitions from L level to H level.

Figure 5:
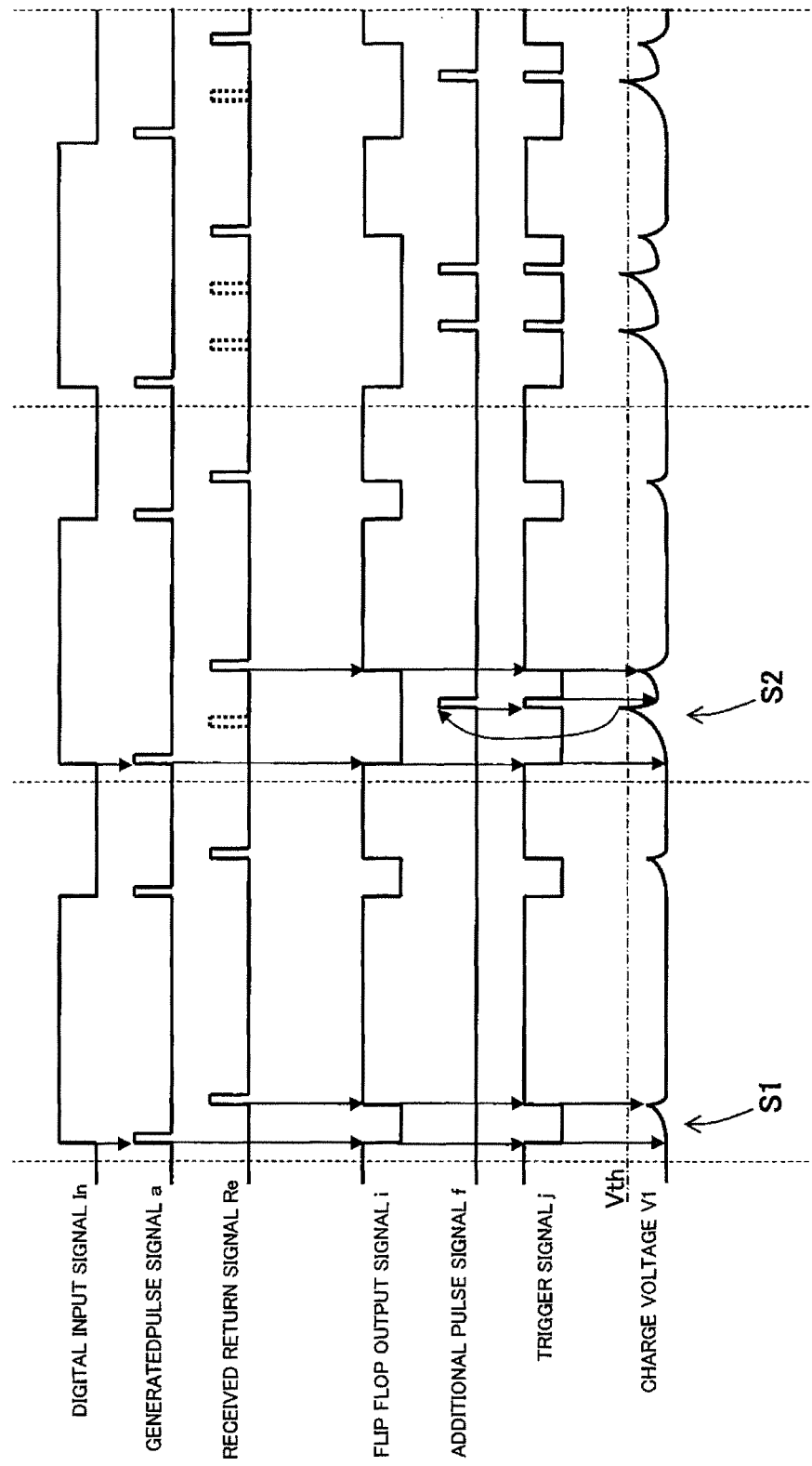
FIG. 5 is a graph showing waveforms of signals, respectively, in sections of the verification circuit of FIG. 4.

Hereinafter, an operation of the verification circuit 5 will be described in detail. FIG. 5 is a graph showing waveforms of signals, respectively, in sections of the verification circuit 5 of FIG. 4. Referring to FIG. 5, the flip flop output signal i which is the inverted output of the RS flip flop circuit 23 is at H level higher than L level, in an initial state. Therefore, the trigger signal j which is the output of the OR circuit 24 is at H level, and the switching element 25 is in ON-state. In this state, no charge is stored in the capacitor 26, the charge voltage V1 is a ground voltage, and the additional pulse signal f is at L level (no pulse is generated).

Under this condition, when the generated pulse signal a output from the edge pulse generating circuit 6 becomes H level according to the transition (rising) of the digital input signal In from the first level L to the second level H, the flip flop output signal i which is the inverted output of the RS flip flop circuit 23 becomes L level. Because of this, the trigger signal j which is the output of the OR circuit 24 transitions to L level and the switching element 25 is turned OFF. As a result, the capacitor 26 is charged with the voltage based on the digital input signal In and the charge voltage V1 rises.

When the received return signal Re based on the return signal e from the receiving unit 2 which is input to the reset input terminal R of the RS flip flop circuit 23 becomes H level within a predetermined time period after the charge voltage V1 starts rising, the flip flop output signal i of the RS flip flop circuit 23 becomes H level, as indicated by S1 of FIG. 5. Because of this, the trigger signal j which is the output of the OR circuit 24 transitions to H level and the switching element 25 is turned ON. Thereby, the capacitor 26 is discharged and the charge voltage V1 becomes the ground voltage V1 again.

On the other hand, when the received return signal Re input to the reset input terminal R of the RS flip flop circuit 23 does not become H level within the predetermined time period after the charge voltage V1 starts rising (the pulse transmitted from the transmission unit 1 has not been sent back from the receiving unit 2), the charge voltage V1 reaches the threshold voltage Vth and the signal level at the first input according to the charge voltage V1 of the AND circuit 28 of the additional pulse generating circuit 22 becomes H level, as indicated by S2 of FIG. 5. At this time, since the inverted output of the charge voltage V1 is input to the second input of the AND circuit 28 after it is delayed for the predetermined time period, the inverted output (i.e., H level) of the signal at L level at the first input is input to the second input of the AND circuit 28. Therefore, the output signal of the AND circuit 28 transitions from L level to H level.

Thereafter, the inverted output (i.e., L level) of the signal at H level at the first input is input to the second input of the AND circuit 28. Therefore, the output signal of the AND circuit 28 transitions from H level to L level. As a result, the AND circuit 28 outputs an additional pulse having a pulse duration for a delay time of the inverting circuit 29. Because of this, the additional pulse signal f becomes H level for a certain time, and therefore, the trigger signal j which is the output of the OR circuit 24 becomes H level for a certain time. Thereby, charging of the capacitor 26 starts again after the switching element 25 causes the capacitor 26 to be discharged. The additional pulse signal f containing the additional pulse is added to the generated pulse signal a and is transmitted to the receiving unit 2 again. When the received return signal Re transitions to H level in response to the additional pulse, the flip flop output signal i becomes H level, the trigger signal j transitions to H level, and the switching element 25 is turned ON, as in the case of S1 of FIG. 5. If the received return signal Re does not transition to H level even after the additional pulse is generated and transmitted to the receiving unit 2, then the charge voltage V1 reaches the threshold voltage Vth or more again and a new additional pulse is generated.

Although in this embodiment, the inverting circuit 29 implements a delayed signal input, one or a plurality of buffer circuits may be connected in series with the inverting circuit 29 to obtain a desired pulse duration.

A similar operation occurs when the generated pulse signal a output from the edge pulse generating circuit 6 becomes L level according to the transition (falling) of the digital input signal In from the second level H to the first level L.

As described above, the capacitor 26 of the charge pump circuit 21 is charged according to the detection of the transition of the digital input signal In, and the additional pulse is generated when the voltage of the capacitor 26 of the charge pump circuit 21 reaches the threshold voltage Vth or more. Therefore, with a simple configuration, it can be determined whether or not the pulse has been sent back from the receiving unit 2 within a time period from when charging of the capacitor 26 of the charge pump circuit 21 starts until the charge voltage V1 reaches the threshold voltage Vth or more, and the additional pulse can be generated if it is determined that the pulse has not been sent back from the receiving unit 2.

Modification Example of Embodiment 1

Figure 6:
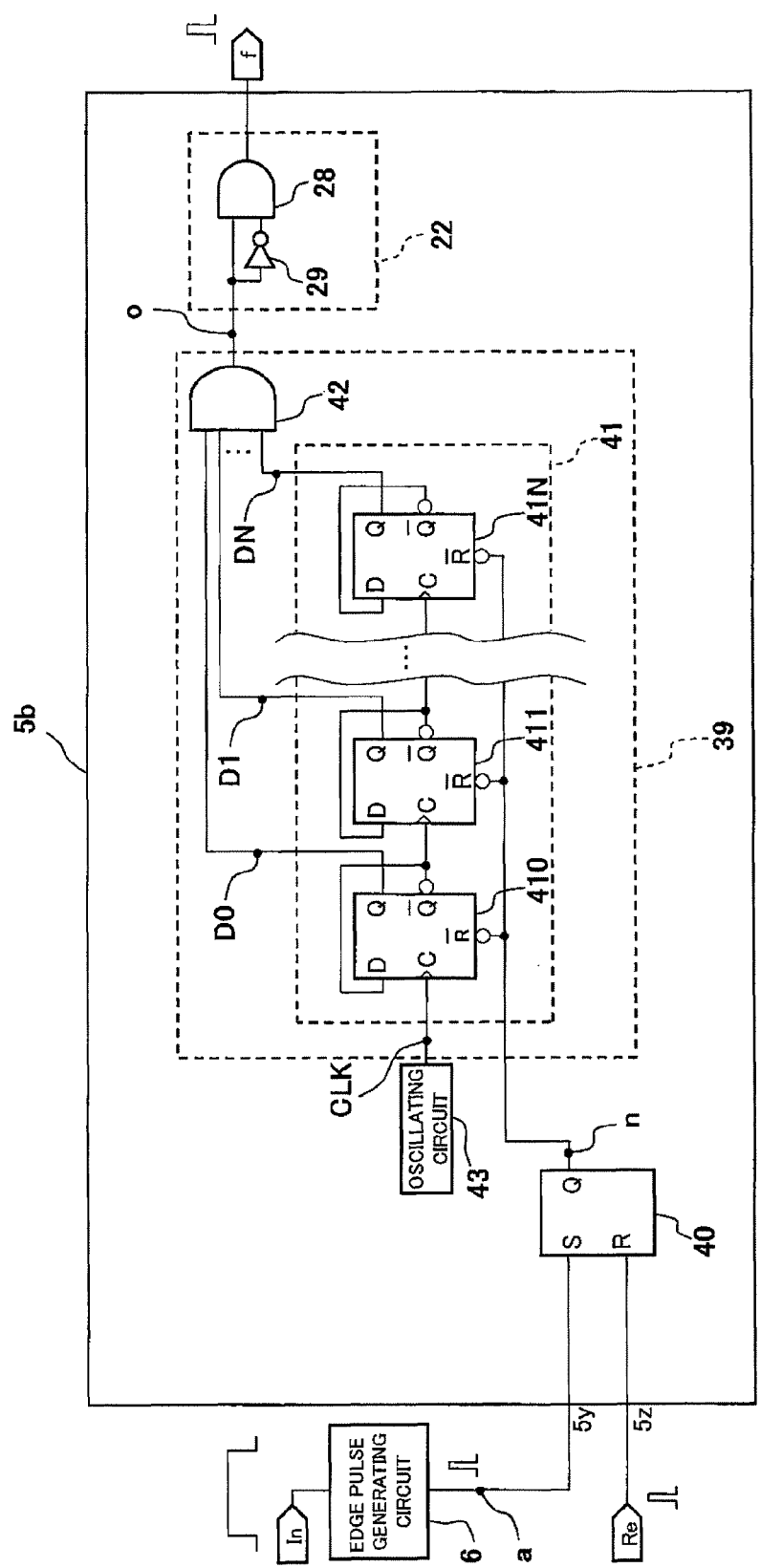
FIG. 6 is a circuit diagram showing another exemplary verification circuit in the isolated communication system of FIG. 1.
Figure 7:
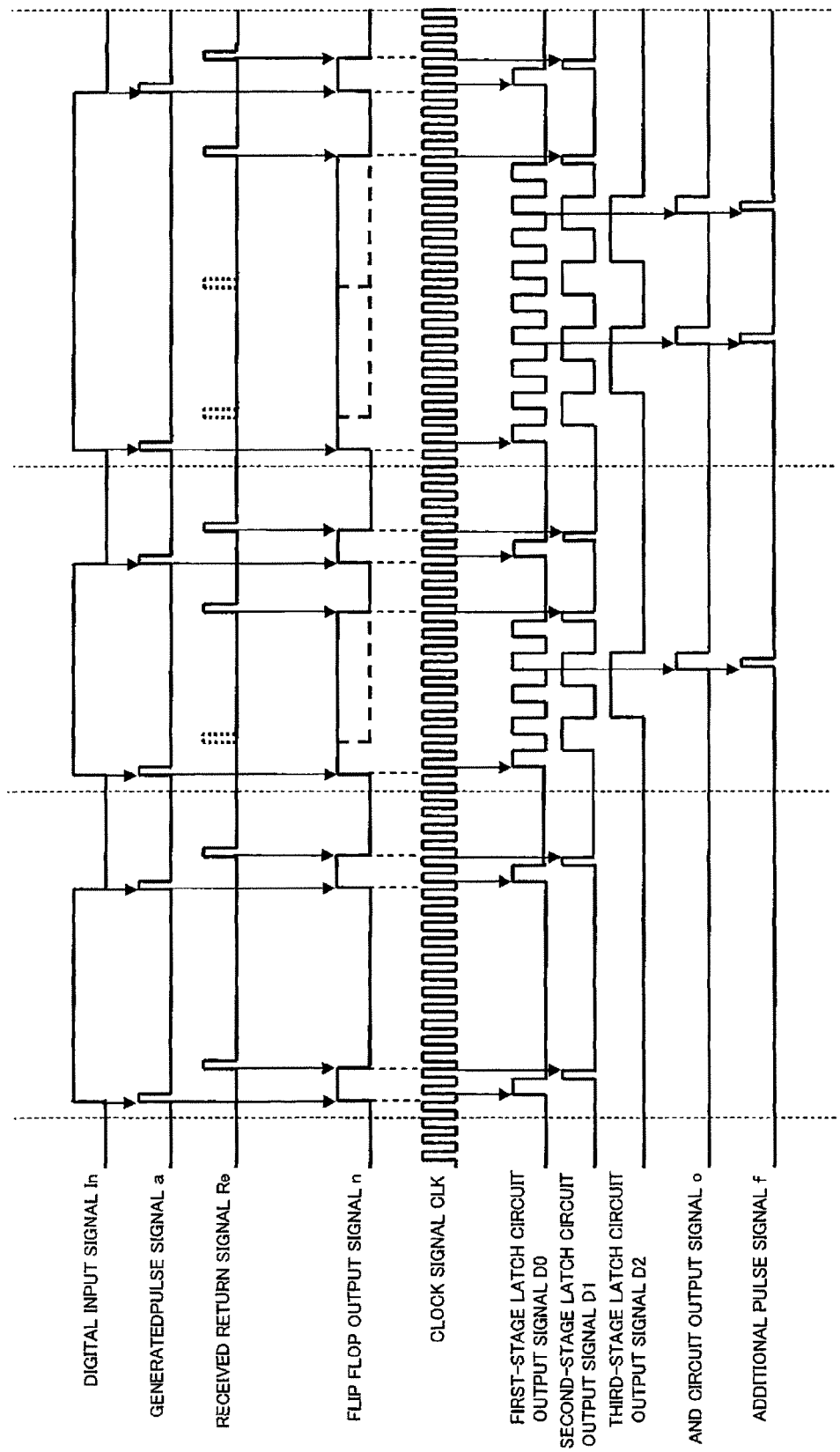
FIG. 7 is a graph showing waveforms of signals, respectively, in sections of the verification circuit of FIG. 6.

The verification circuit 5 of Embodiment 1 may be replaced by a verification circuit 5b which measures a time that lapses after the signal level of the digital input signal In has transitioned and determines whether or not to generate an additional pulse based on whether or not a pulse has been sent back from the receiving unit 2 within a predetermined time period. FIG. 6 is a circuit diagram showing another exemplary verification circuit in the isolated communication system of FIG. 1. FIG. 7 is a graph showing waveforms of signals, respectively, in sections of the verification circuit of FIG. 6.

Referring to FIG. 6, the verification circuit 5b includes a counter circuit 39 which starts counting according to the transition of the digital input signal In as a trigger and resets the counted number upon detection of the pulse sent back from the receiving unit 2, an additional pulse generating circuit 22 for generating an additional pulse when the counter circuit 39 counts a predetermined number or more, and a counter control circuit 40 for controlling start and end of a counting operation of the counter circuit 39.

The counter control circuit 40 is constituted by a RS flip flop circuit which alternately detects the generated pulse signal a output from the edge pulse generating circuit 6 and the received return signal Re and thereby outputs a signal whose signal level transitions repetitively. The counter control circuit 40 is fed with the generated pulse signal a at a set input terminal S via an input terminal 5y of the verification circuit 5b and with the received return signal Re at a reset input terminal R via an input terminal 5z of the verification circuit 5b. The counter control circuit 40 outputs a flip flop signal n output through the output terminal Q to the counter circuit 39.

The counter circuit 39 includes a counter section 41 constituted by a plurality of latch circuits 41$i$ (i=0~N) and an AND circuit 42 to which outputs Di (i=0~N) of the plurality of latch circuits 41$i$ are input. In this embodiment, the plurality of latch circuits 41$i$ are each constituted by a D flip flop circuit having a reset terminal R. To a clock input terminal C of a latch circuit 410 in a first stage, a clock signal CLK from an oscillating circuit 43 is input. To clock input terminals C of the latch circuits 411 to 41N in other stages, inverted outputs of latch circuits 410 to 41 (N−1) in their precious stages are input, respectively. To an input terminal D of the latch circuit 41$i$, an inverted output of the latch circuit 41$i$ is input. To an inverting reset input terminal R of the latch circuit 41$i$, the flip flop signal n output through the output terminal Q of the counter control circuit 40 is input. Although in the example shown in FIG. 7, the clock signal CLK output from the oscillating circuit 43 is depicted as having a low frequency (clock frequency) for the purpose of easier illustration, it actually has a frequency sufficiently higher than a frequency of the digital input signal In.

The additional pulse generating circuit 22 is configured like that shown in FIG. 4. An output of the AND circuit 42 of the counter circuit 39 and its inverted output are input to the AND circuit 28.

In accordance with the above configuration, when the counter control circuit 40 detects the transition (generated pulse signal a) of the digital input signal In, reset of each of the latch circuits 41i is released and the counter circuit 39 starts counting. As shown in FIG. 7, the latch circuit 410 in first stage generates a cyclic output pulse according to the clock signal CLK. The latch circuit 411 in second stage generates a cyclic output pulse according to the output of the latch circuit 410 in first stage.

In this case, an output pulse of the latch circuit 411 in second stage is a half-cycle delayed with respect to the output pulse of the latch circuit 410 in first stage and has a pulse duration which is twice as long as that of the output pulse of the latch circuit 410 in first stage. Thereafter, in the same manner, the latch circuits 412 to 41N in subsequent stages sequentially generate pulses so long as the received return signal Re is not input to the counter control circuit 40. If the received return signal Re is input to the counter control circuit 40 before the number counted in the counter circuit 39 reaches a maximum value (all of the latch circuits 41i finish outputting pulses), then all of the latch circuits 41i are reset and the counter is reset. Therefore, the output signal of the AND circuit 42 of the counter circuit 39 remains L level and as a result, the additional pulse generating circuit 22 generates no additional pulse.

On the other hand, if the received return signal Re is not input to the counter control circuit 40 and all of the latch circuits 41i output the pulses (i.e., in the example of FIG. 6, output signals D0, D1 and D2 of the three latch circuits 410 to 412 become H level higher than L level), the output signal of the AND circuit 42 of the counter circuit 39 becomes H level higher than L level, and therefore, the additional pulse generating circuit 22 generates an additional pulse. Since the counter circuit 39 starts counting again so long as the counter circuit 39 is not reset by the counter control circuit 40, all of the latch circuits 41i of the counter circuit 39 are placed in a state where they output the pulses at H level again and the additional pulse is generated periodically, if the received return signal Re is not input to the counter control circuit 40 even after the additional pulse is generated. Alternatively, the number of additional pulses sequentially generated may be counted, and the latch circuits 41i may be reset if the counted number reaches a predetermined number. This makes it possible to detect a communication trouble which occurs, for example, when a communication path is disconnected due to degradation progressing over time, failure, etc.

In accordance with the above configuration, when the transition of the digital input signal In is detected, the counter circuit 39 starts counting, and when the number counted by the counter circuit 39 reaches the predetermined number or more, the additional pulse is generated. Therefore, with a simple configuration, it can be determined whether or not the pulse has been sent back from the receiving unit 2 within a time period from when the counter circuit 39 starts counting until the counted number reaches a predetermined number or more, and the additional pulse can be generated if it is determined that the pulse has not been sent back from the receiving unit 2.

Embodiment 2

Figure 8:
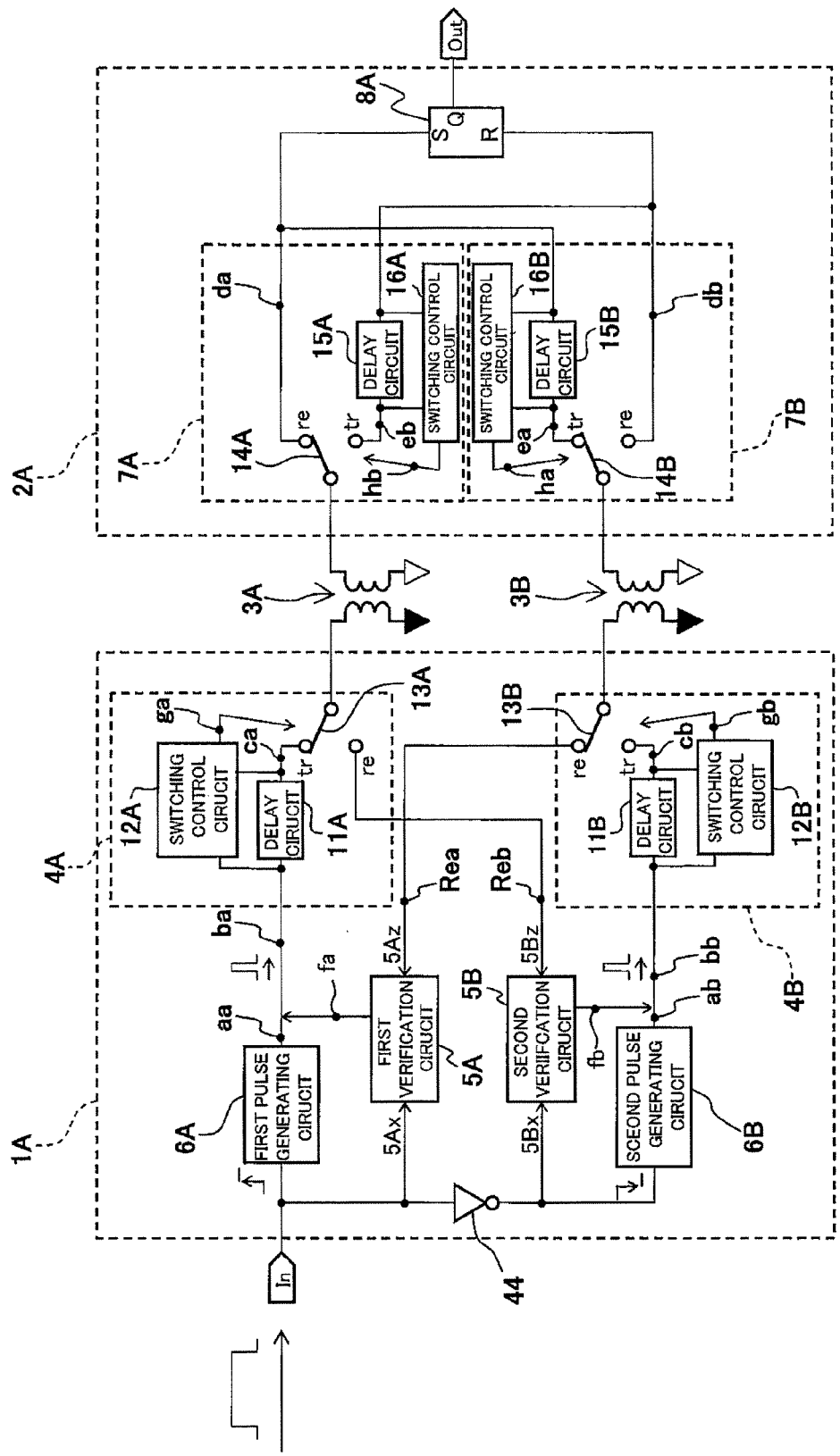
FIG. 8 is a circuit diagram showing a schematic configuration of an isolated communication system according to Embodiment 2 of the present invention.
Figure 9:
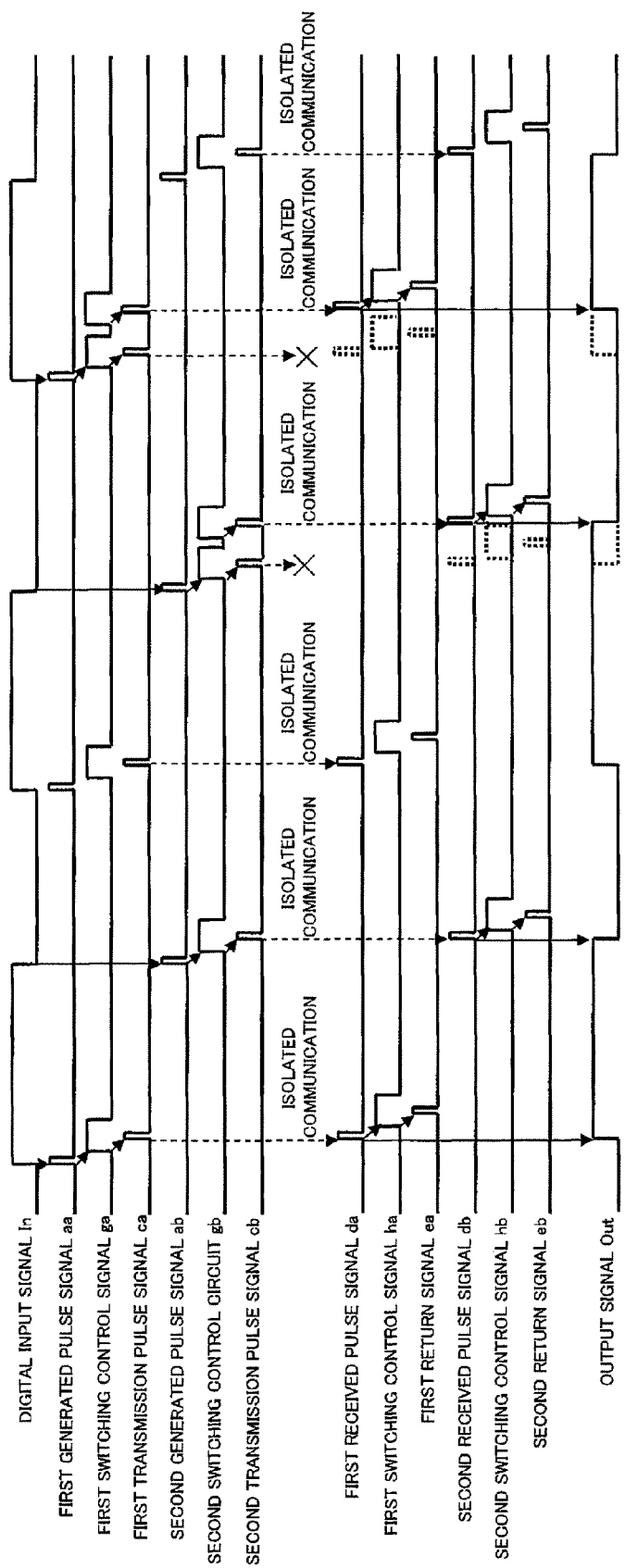
FIG. 9 is a graph showing waveforms of signals, respectively, in sections of the isolated communication system of FIG. 8.

Subsequently, an isolated communication system according to Embodiment 2 of the present invention will be described. FIG. 8 is a circuit diagram showing a schematic configuration of an isolated communication system according to Embodiment 2 of the present invention. FIG. 9 is a graph showing waveforms of signals, respectively, in sections of the isolated communication system of FIG. 8. In Embodiment 2, the same or corresponding constituents as those of Embodiment 1 are designated by the same reference symbols and will not be described repetitively.

As shown in FIGS. 8 and 9, an isolated communication system of Embodiment 2 is different from the isolated communication system of Embodiment 1 in that transmission pulse signals corresponding to a first pulse and a second pulse are transmitted using their corresponding isolated communication units 3A and 3B, respectively, and the corresponding return signals are sent back using the isolated communication units 3B and 3A which are different from the isolated communication units 3A and 3B used to transmit the transmission pulse signals, respectively.

To be specific, an edge pulse generating circuit of a transmission unit 1A of Embodiment 2 includes a first pulse generating circuit 6A for generating a first pulse corresponding to a transition (first transition) of the digital input signal In from the first level L to the second level H, and a second pulse generating circuit 6B for generating a second pulse corresponding to a transition (second transition) of the digital input signal In from the second level H to the first level L.

In this embodiment, the first pulse generating circuit 6A and the second pulse generating circuit 6B have a similar circuit configuration. The second pulse generating circuit 6B is fed with an inverted signal of the digital input signal In. To be specific, an inverting circuit 44 for inverting the digital input signal In and outputting an inverted signal is connected to the second pulse generating circuit 6B. Therefore, the first pulse generating circuit 6A and the second pulse generating circuit 6B are each configured as a circuit for detecting the transition (rising) of the signal from the first level L to the second level H.

The transmission unit 1A includes first and second transmission-side transmitting circuits 4A and 4B for transmitting pulses generated in the first and second pulse generating circuits 6A and 6B and first and second verification circuits 5A and 5B as described later to a receiving unit 2A via first and second isolated communication units 3A and 3B, respectively (hereinafter these pulses are also referred to as transmitting circuit input signals (ba, bb)). The first and second transmission-side transmitting circuits 4A and 4B are configured like the transmission-side transmitting circuit 4 of Embodiment 1. To be specific, the first transmission-side transmitting circuit 4A includes a delay circuit 11A, a switching control circuit 12A, and a switch 13A, and the second transmission-side transmitting circuit 4B includes a delay circuit 11B, a switching control circuit 12B, and a switch 13B.

The receiving unit 2A includes first and second receiving-side transmitting circuits 7A and 7B for receiving pulses (received pulse signals da, db) received from the transmission unit 1A via the first and second isolated communication units 3A and 3B, respectively. The first receiving-side transmitting circuit 7A includes a switch 14A, a delay circuit 15A and a switching control circuit 16A. The second receiving-side transmitting circuit 7B includes a switch 14B, a delay circuit 15B and a switching control circuit 16B. The receiving unit 2A includes a decode circuit 8A for decoding the pulses received in the first and second receiving-side transmitting circuits 7A and 7B to generate a digital output signal Out.

In this embodiment, the isolated communication unit includes a first isolated communication unit 3A for transmitting the first pulse generated in the first pulse generating circuit 6A to the receiving unit 2A, and a second isolated communication unit 3B for transmitting the second pulse generated in the second pulse generating circuit 6B to the receiving unit 2A.

In the configuration of Embodiment 2, the transmission unit 1A and the receiving unit 2A are configured in such a manner that the first pulse transmitted from the first pulse generating circuit 6A in the transmission unit 1A to the receiving unit 2A via the first isolated communication unit 3A can be sent back from the receiving unit 2A via the second isolated communication unit 3B, and the second pulse transmitted from the second pulse generating circuit 6B in the transmission unit 1A to the receiving unit 2A via the second isolated communication unit 3B can be sent back from the receiving unit 2A via the first isolated communication unit 3A.

In Embodiment 2, a verification circuit includes a first verification circuit 5A which determines whether or not the pulse has been sent back from the receiving unit 2A via the second isolated communication unit 3B and generates a first additional pulse if it is determined that the pulse has not been sent back from the receiving unit 2A, and a second verification circuit 5B which determines whether or not the pulse has been sent back from the receiving unit 2A via the first isolated communication unit 3A and generates a second additional pulse if it is determined that the pulse has not been sent back from the receiving unit 2A. Furthermore, the transmission unit 1A is configured to transmit the first pulse generated in the first pulse generating circuit 6A and the first additional pulse generated in the first verification circuit 5A to the receiving unit 2A via the first isolated communication unit 3A, and transmit the second pulse generated in the second pulse generating circuit 6B and the second additional pulse generated in the second verification circuit 5B to the receiving unit 2A via the second isolated communication unit 3B.

In the above explained configuration, a shown in FIG. 9, the first pulse generating circuit 6A of the transmission unit 1A generates a pulse (first generated pulse signal aa) corresponding to a first transition (rising) of the digital input signal In from the first level L to the second level H. The first generated pulse signal aa is input to the delay circuit 11A and to the switching control circuit 12A of the first transmission-side transmitting circuit 4A, as the first transmitting circuit input signal ba. The delay circuit 11A and the switching control circuit 12A are configured like those of Embodiment 1 (FIG. 3).

The delay circuit 11A is configured to output a first pulse (first transmission pulse signal ca) which is generated by delaying the first transmitting circuit input signal ba for a predetermined time period. The switching control circuit 12A is configured to output a pulse (first transmission-side switching control signal ga) held at the second level H for a predetermined time period after the first transmitting circuit input signal ba has transitioned to the second level H. Thus, the first switch 13A is connected to the receiving end re for a time period during which the first transmission-side switch control signal ga is held at the first level L and is connected to the transmission end tr for a time period during which the first transmission-side switching control signal ga is held at the second level H.

In the above configuration, when the first pulse (first transmitting circuit input signal ba) is input to the switching control circuit 12A, the switching control circuit 12A switches the switch 13A from a state where it is connected to the receiving end re to a state where it is connected to the transmission end tr. Therefore, the first transmission pulse signal ca is communicated isolatedly to the first receiving-side transmitting circuit 7A of the receiving unit 2A via the first isolated communication unit 3A. After accomplishing transmission of the first transmission pulse signal ca (after the first transmission-side switching control signal ga has fallen), the switching control circuit 12A re-switches the switch 13A to connect it to the receiving end re again.

The first received pulse signal da based on the first transmission pulse signal ca received in the first receiving-side transmitting circuit 7A is sent to the second receiving-side transmitting circuit 7B and is input to the delay circuit 15B and to the switching control circuit 16B of the second receiving-side transmitting circuit 7B. Receiving the first received pulse signal da, the delay circuit 15B outputs a first return signal ea generated by delaying the first received pulse signal da for a predetermined period time. The switching control circuit 16B outputs a pulse (first receiving-side switching control signal ha) held at the second level H for a predetermined time period after the first received pulse signal da has transitioned to the second level H.

In the above configuration, when the pulse (first received pulse signal da) is input to the switching control circuit 16B, the switching control circuit 16B switches the switch 14B from a state where it is connected to the receiving end re to a state where it is connected to the transmission end tr. Therefore, the first return signal ea is communicated isolatedly to the second transmission-side transmitting circuit 4B via the second isolated communication unit 3B. After accomplishing transmission of the first return signal ga (after the first receiving-side switching control signal ha has fallen), the switching control circuit 16B re-switches the switch 14B to connect it to the receiving end re.

A first received return signal Rea based on the first return signal ea received in the second transmission-side transmitting circuit 4B is sent to the first verification circuit 5A.

In the same manner, the first pulse generating circuit 6B of the transmission unit 1A generates a pulse (second generated pulse signal ab) corresponding to a second transition (falling) of the digital input signal In from the second level H to the first level L. To be specific, the first pulse generating circuit 6B detects a transition (rising) of an inverted signal of the digital input signal In from the first level L to the second level H and thereby generates the pulse corresponding to the second transition.

Thereafter, like signal transmission which occurs in which the signal based on the first generated pulse signal aa is transmitted to the first transmission-side transmitting circuit 4A, the first isolated communication unit 3A, the first receiving-side transmitting circuit 7A, the second receiving-side transmitting circuit 7B, the second isolated communication unit 3B and the first verification circuit 5A in this order, a signal based on the second generated pulse signal ab is transmitted to the second transmission-side transmitting circuit 4B, the second isolated communication unit 3B, the second receiving-side transmitting circuit 7B, the first receiving-side transmitting circuit 7A, the first isolated communication unit 3A, the first transmission-side transmitting circuit 4A, and the second verification circuit 5B in this order.

Figure 10:
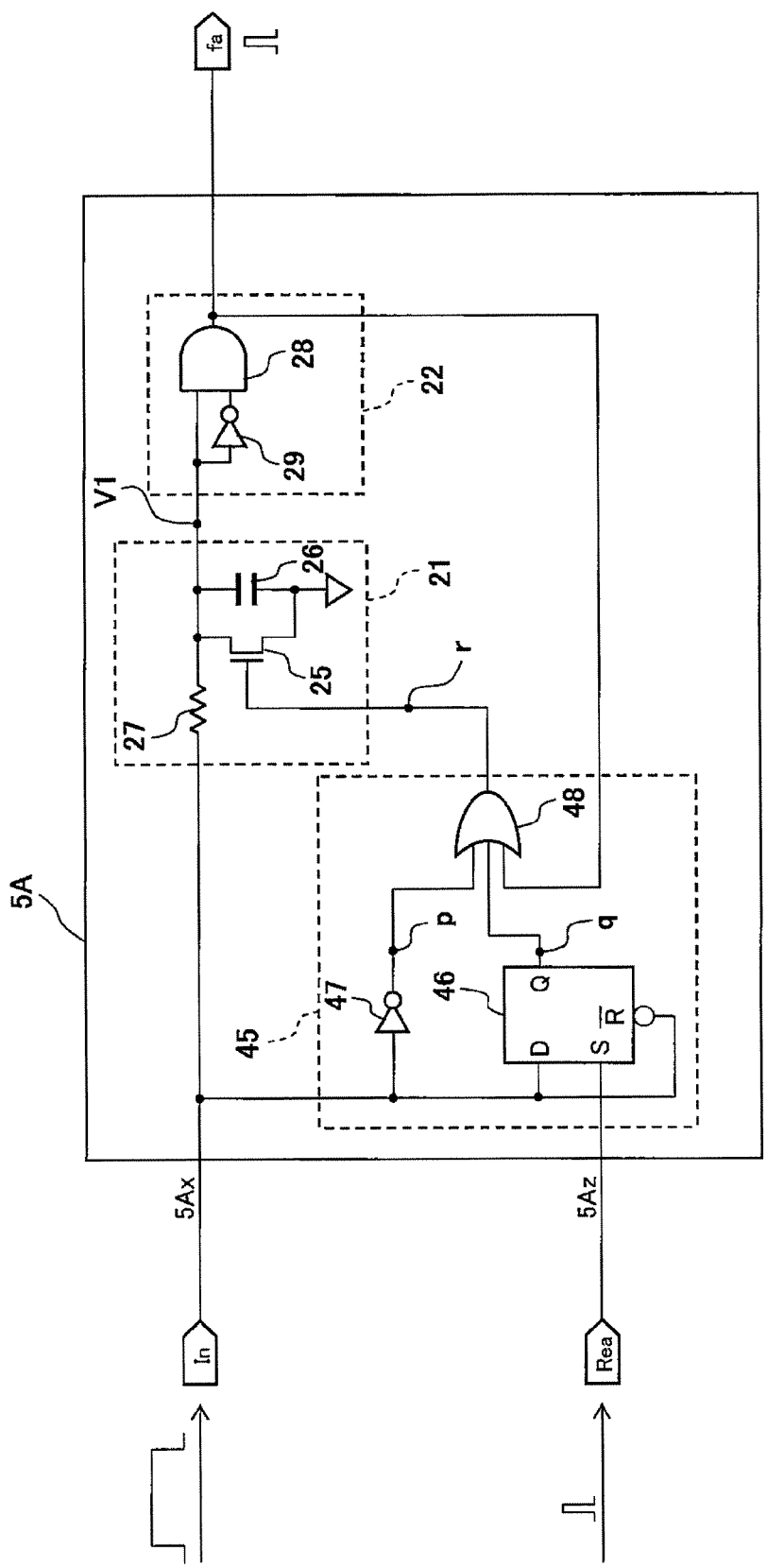
FIG. 10 is a circuit diagram showing an exemplary first verification circuit in the isolated communication system of FIG. 8.
Figure 11:
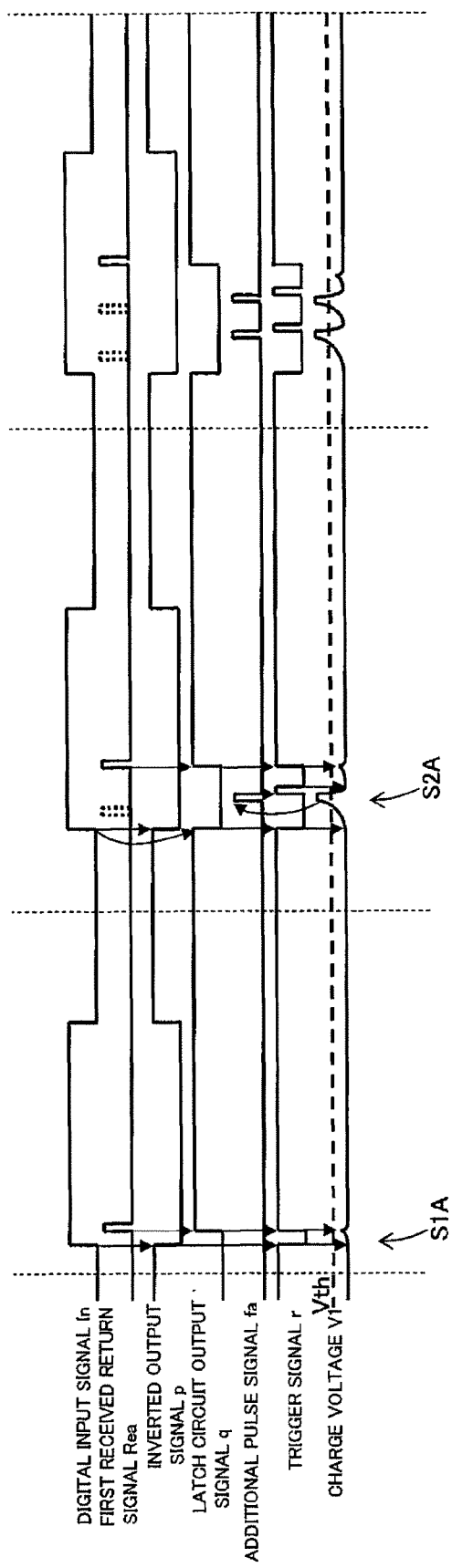
FIG. 11 is a graph showing waveforms of signals, respectively, in sections of the first verification circuit of FIG. 10.

FIG. 10 is a circuit diagram showing an exemplary first verification circuit in the isolated communication system of FIG. 8. FIG. 11 is a graph showing waveforms of signals, respectively, in sections of the first verification circuit of FIG. 10. Although only a configuration of the first verification circuit 5A will be described hereinafter, the second verification circuit 5B is configured like the first verification circuit 5A of FIG. 10. Like the verification circuit 5 of Embodiment 1, the first verification circuit 5A includes a charge trigger circuit 45 for detecting the transition of the digital input signal In and the pulse sent back from the receiving unit 2, the charge pump circuit 21 which starts charging of the capacitor 26 when the charge trigger circuit 45 detects the transition of the digital input signal In, as a trigger, and starts discharging of the capacitor 26 when the charge trigger circuit 45 detects the pulse sent back from the receiving unit 2, as a trigger, and the additional pulse generating circuit 22 for generating the additional pulse when the voltage of the capacitor 26 reaches the threshold voltage Vth or more by the charging of the capacitor 26 by the charge pump circuit 21.

In this embodiment, in the first verification circuit 5A, the charge trigger circuit 45 is different from the charge trigger circuit 20 of Embodiment 1 in that the charge trigger circuit 45 detects only the rising from the first level L to the second level H, in the transitions of the digital input signal In.

To be specific, the charge trigger circuit 45 includes a latch circuit 46 which detects the first received return signal Rea for a time period during which the digital input signal In is at the second level H, and outputs the transition (transition from L level to H level higher than L level), an inverting circuit 47 for inverting the digital input signal In and outputting an inverted signal, and an OR circuit 48 fed with an output signal q of the latch circuit 46, an output signal p of the inverting circuit 47, and an output signal (i.e., additional pulse signal fa) of the first verification circuit 5A. The latch circuit 46 is constituted by a D flip flop circuit having a reset terminal R (inverting reset terminal). The digital input signal In is input to an input terminal D and the inverting reset terminal R of the latch circuit 46 through an input terminal 5Ax of the first verification circuit 5A, while the first received return signal Rea is input to the set input terminal S of the latch circuit 46 through an input terminal 5Az of the first verification circuit 5A. An output terminal Q of the latch circuit 46 is connected to an input terminal of the OR circuit 48.

As shown in FIG. 11, in an initial state, for a time period during which the digital input signal In is at the first level L, the inverted output signal p of the inverting circuit 47 is at H level, and therefore, the output signal (trigger signal) r of the OR circuit 48 is at H level. At this time, the output signal of the latch circuit 46 and the output signal the first verification circuit 5A are both at L level. Therefore, the switching element 25 of the charge pump circuit 21 is in ON-state, and the charge voltage V1 applied to the capacitor 26 is a ground voltage (the capacitor 26 is in a discharged state). In this state, when the digital input signal In transitions to the second level H, the inverted output signal p of the inverting circuit 47 becomes L level, and the trigger signal r which is the output of the OR circuit 48 becomes L level. Therefore, the switching element 25 of the charge pump circuit 21 is turned OFF, the capacitor 26 is placed in a state where it is charged based on the voltage of the digital input signal In, and the charge voltage V1 rises. Since the digital input signal In has transitioned to the second level H, the signal at the inverting reset input terminal R of the latch circuit 46 becomes H level, thus allowing the latch circuit 46 to be placed in a state where it can accept the signal input to the set input terminal S.

In a case where H level of the first received return signal Rea based on the first return signal ea from the receiving unit 2A is input to the set input terminal S of the latch circuit 46 within a predetermined time period after the charge voltage V1 starts rising, the output signal q of the latch circuit 46 becomes H level, as indicated by S1A of FIG. 11. Because of this, the trigger signal r which is the output of the OR circuit 48 transitions to H level and the switching element 25 is turned ON. Thereby, the capacitor 26 is discharged, and the charge voltage V1 becomes a ground voltage again. It should be noted that the output signal q of the latch circuit 46 transitions to L level when the digital input signal In transitions from the first level L to the second level H next.

On the other hand, in a case where the first received return signal Rea input to the set input terminal S of the latch circuit 46 does not become H level within the predetermined time period after the charge voltage V1 starts rising (i.e., the pulse transmitted from the transmission unit 1A has not been sent back from the receiving unit 2A), the charge voltage V1 reaches the threshold voltage Vth, and the additional pulse is generated in the additional pulse generating circuit 22 (additional pulse signal fa becomes H level), as indicated by S2A of FIG. 11.

The additional pulse signal fa containing the additional pulse is added to the first generated pulse signal a and transmitted to the receiving unit 2A again. When the first received return signal Rea transitions to H level in response to the additional pulse, the output signal q of the latch circuit 46 becomes H level, the trigger signal r becomes H level, and the switching element 25 is turned ON, as in the case of S1A of FIG. 11. Since the generated additional pulse allows the additional pulse signal fa to become H level, the trigger signal r which is the output of the OR circuit 48 of the charge trigger circuit 45 becomes H level for a duration of the additional pulse. Therefore, after the switching element 25 of the charge pump circuit 21 is turned ON and charge of the capacitor 26 is reset, the switching element 25 is turned OFF and the capacitor 26 is re-charged. In this way, even in a case where the first received return signal Rea does not become even after the additional pulse is generated and transmitted to the receiving unit 2A, the additional pulse can be generated again.

In this embodiment, the decode circuit 8A is constituted by a RS flip flop circuit having a set input terminal S to which one (received pulse signal da of the first receiving-side transmitting circuit 7A) of received pulses of the first and second receiving-side transmitting circuits 7A and 7B is input, and a reset input terminal R to which the other received pulse (received pulse signal db of the second receiving-side transmitting circuit 7B) is input. The decode circuit 8A decodes the first transition of the digital input signal In based on the pulse received in the first receiving-side transmitting circuit 7A and decodes the second transition of the digital input signal In based on the pulse received in the second receiving-side transmitting circuit 7B. In this way, the decode circuit 8A outputs a digital output signal Out according to the digital input signal In.

In accordance with the configuration of Embodiment 2, the transmission unit 1A distinguishes the transition of the digital input signal In, between the transition from the first level L to the second level H and the transition from the second level H to the first level L, and transmits the first pulse corresponding to the transition from the first level L to the second level H and the second pulse corresponding to the transition from the second level H to the first level L, to the receiving unit 2A, using the corresponding isolated communication units 3A and 3B, respectively. The first and second pulses received in the receiving unit 2A are sent back using the isolated communication units 3B and 3A, respectively, which are different from the isolated communication units 3A and 3B used to transmit the first and second pulses to the receiving unit 2A, respectively. Since the first and second pulses are sent back using the isolated communication units 3B and 3A, respectively, which are different from the isolated communication units 3A and 3B used to transmit the first and second pulses, respectively, it is not necessary to switch the transmission unit 1A from a signal-transmissible state to a signal-receivable state just after the transmission unit 1A has transmitted the pulse, and to switch the receiving unit 2A from a signal-receivable state to a signal-transmissible state, just after the receiving unit 2A has received the pulse. Thus, a higher-speed verifying operation is achieved. In addition, the first and second pulses corresponding to the first transition and second transition, are transmitted using their corresponding isolated communication units 3A and 3B, respectively, it is possible to surely decode the digital input signal In in the receiving unit 2A.

Modification Example of Embodiment 2

Figure 12:
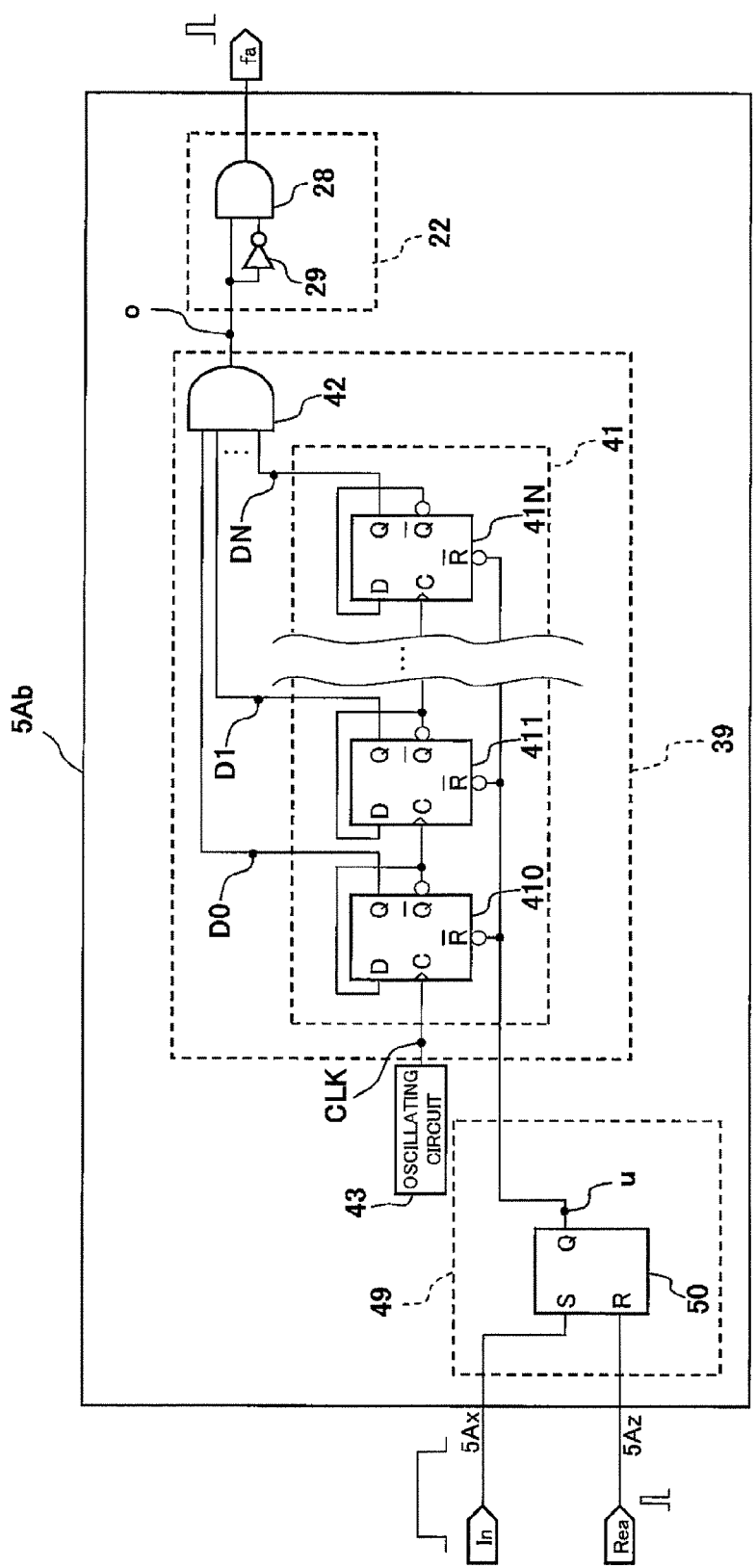
FIG. 12 is a circuit diagram showing another exemplary first verification circuit in the isolated communication system of FIG. 8.
Figure 13:
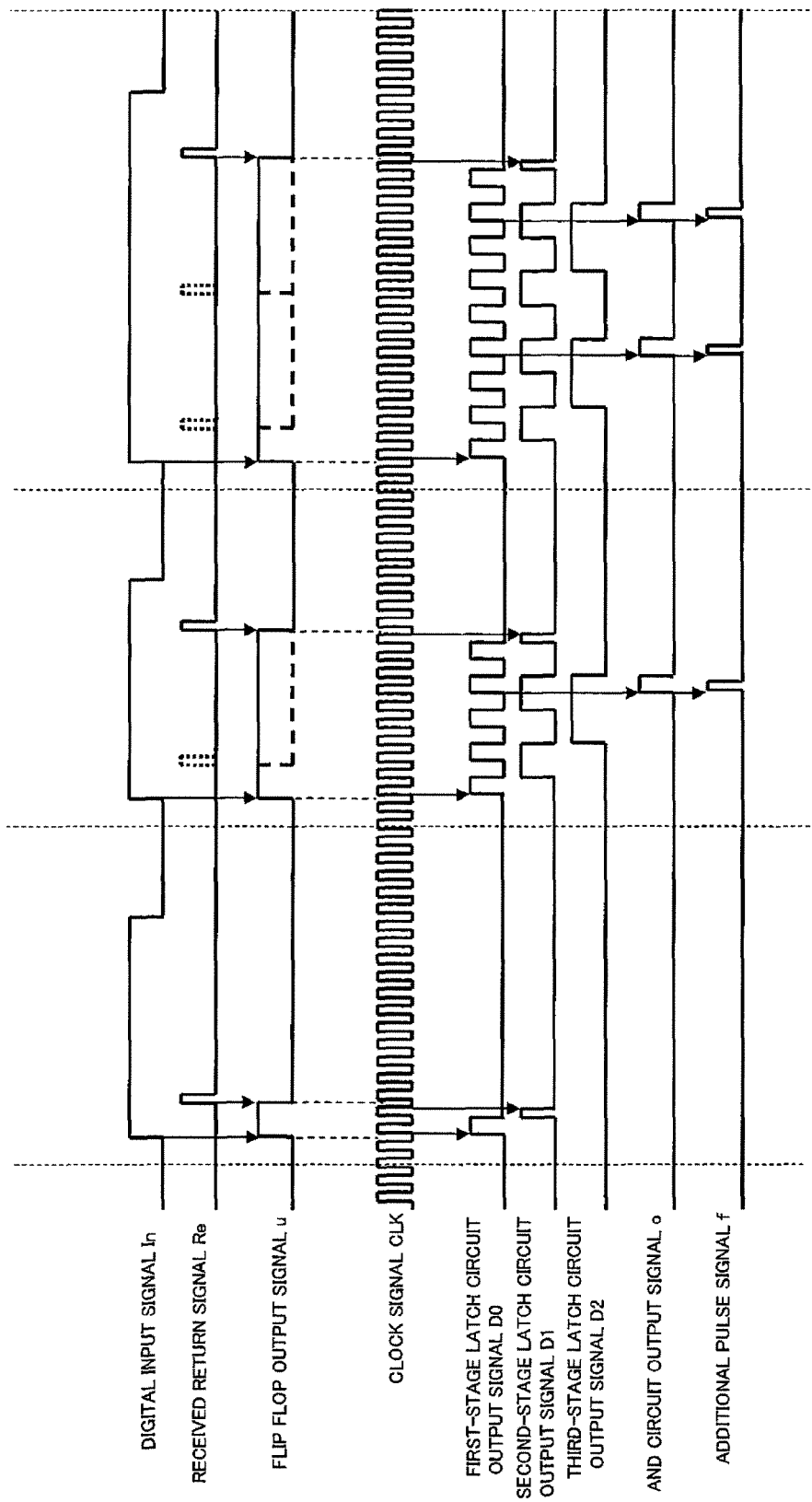
FIG. 13 is a graph showing waveforms of signals, respectively, in sections of the first verification circuit of FIG. 12.

Like Embodiment 1, in Embodiment 2, the verification circuits 5A and 5B of the above mentioned charge pump type may replaced by a verification circuit 5Ab which measures a time from when the digital input signal In has transitioned and determines whether or not to generate an additional pulse based on whether or not the pulse has been sent back from the receiving unit 2A within a predetermined time period. FIG. 12 is a circuit diagram showing another exemplary first verification circuit in the isolated communication system of FIG. 8. FIG. 13 is a graph showing waveforms of signals, respectively, in sections of the first verification circuit of FIG. 12.

The first verification circuit 5Ab of FIG. 12 has substantially the same configuration as that of the verification circuit 5c of FIG. 6. The first verification circuit 5Ab includes the counter circuit 39 which starts counting when a counter control circuit 49 detects the transition of the digital input signal In as a trigger and resets the counted number when the counter control circuit 49 detects the pulse sent back from the receiving unit 2, the additional pulse generating circuit 22 for generating an additional pulse when the counter circuit 39 counts the predetermined number or more, and the counter control circuit 49 for controlling start and end of the counting operation of the counter circuit 39.

The first verification circuit 5Ab is different from the verification circuit 5c of FIG. 6 in that the counter control circuit 49 detects only the rising from the first level L to the second level H, in the transitions of the digital input signal In.

To be specific, the counter control circuit 49 includes a RS flip flop circuit 50 having a set input terminal S to which the digital input signal In is input and a reset input terminal R to which the first received return signal Rea is input. An output signal u of the RS flip flop circuit 50 is input to inverting reset terminals of the respective latch circuits 41i of the counter circuit 39.

In accordance with the above configuration, when the counter control circuit 49 detects the transition of the digital input signal In from the first level L to the second level H, the output signal u of the RS flip flop circuit 50 transitions from L level to H level. Therefore, reset states of the latch circuits 41i are released and the counter circuit 39 starts counting. The counter circuit 39 performs counting like the example shown in FIG. 6.

As described above, in this modification example, when the transition of the digital input signal In is detected, the counter circuit 39 starts counting, and the number counted by the counter circuit 39 reaches the predetermined number or more, the additional pulse is generated. Therefore, with a simple configuration, it can be determined whether or not the pulse has been sent back from the receiving unit 2A within a time period from when the counter circuit 39 starts counting until the counted number reaches the predetermined number or more, and the additional pulse can be generated if it is determined that the pulse has not been sent back from the receiving unit 2A.

Thus far, embodiments and modification examples thereof the present invention have been described. The present invention is not limited to them, but can be improved, altered or modified, within a scope of the invention.

For example, constituents in the above embodiments may be combined as desired. The first level may be higher than the second level (i.e., the first level is H level and the second level is L level). Although the first level L of the digital input signal In is decoded to correspond to the first level L of the digital output signal Out and the second level H of the digital input signal In is decoded to correspond to the second level H of the digital output signal Out in the above embodiments, the circuits may be configured in such a manner that the first level L of the digital input signal In is decoded to correspond to the second level H of the digital output signal Out and the second level H of the digital input signal In is decoded to correspond to the first level L of the digital output signal Out.

An isolated communication system, a transmission unit and a receiving unit of the present invention are useful as an isolated communication system, a transmission unit and a receiving unit, which perform highly-accurate isolated communication with a simple configuration.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. An isolated communication system comprising:
   a transmission unit including an edge pulse generating circuit and a verification circuit;
   a receiving unit isolated from the transmission unit; and
   an isolated communication unit which provides isolation between the transmission unit and the receiving unit and transmits signals between the transmission unit and the receiving unit, wherein:
   the edge pulse generating circuit is configured to convert a digital input signal into a pulse and to send the pulse to the isolated communication unit, the digital input signal transitioning between a first level and a second level different from the first level,
   the isolated communication unit is configured to transmit the pulse generated by the edge pulse generating circuit to the receiving unit,
   the receiving unit is configured to receive the pulse transmitted by the isolated communication unit, to convert the pulse into a digital output signal and to send back the pulse as a return pulse
   the isolated communication unit is configured to transmit the return pulse to the transmission unit, and
   the verification circuit is configured to determine whether or not the transmission unit has received the return pulse sent back from the receiving unit, and is further configured to generate an additional pulse when the verification circuit determines that the transmission unit has not received the return pulse sent back from the receiving unit.

2. The isolated communication system according to claim 1, wherein:
   the transmission unit further includes a transmission-side transmitting circuit, the transmission-side transmitting circuit being configured to be:
   placed in a signal-transmissible state in which an output of the edge pulse generating circuit and an output of the verification circuit are connected to the isolated communication unit, when the transmission-side transmitting circuit detects the pulse generated by the edge pulse generating circuit and the additional pulse generated by the verification circuit, and placed in a signal-receivable state in which an input of the verification circuit is connected to the isolated communication unit, when the transmission-side transmitting circuit does not detect the pulse generated by the edge pulse generating circuit and the additional pulse generated by the verification circuit, and the receiving unit includes a receiving-side transmitting circuit, the receiving-side transmitting circuit being configured to be placed in a signal-receivable state in which the receiving-side transmitting circuit receives the pulse from the transmission unit to a signal-transmissible state in which the receiving-side transmitting circuit sends back the return pulse to the transmission unit via the isolated communication unit, when the receiving-side transmitting circuit detects the pulse transmitted from the transmission unit.

3. The isolated communication system according to claim 1, wherein the verification circuit includes:

a charge trigger circuit for detecting the transition of the digital input signal and the return pulse sent back from the receiving unit;

a charge pump circuit including a capacitor, wherein the charge pump circuit starts charging of the capacitor when the charge trigger circuit detects the transition of the digital input signal, as a trigger, and starts discharging of the capacitor when the charge trigger circuit detects the return pulse sent back from the receiving unit, as a trigger; and an additional pulse generating circuit for generating the additional pulse when a voltage of the capacitor reaches a predetermined threshold voltage or more, by the charging of the capacitor by the charge pump circuit.

4. The isolated communication system according to claim 1, wherein the verification circuit includes:

a counter circuit which starts counting when the verification circuit detects the transition of the digital input signal, as a trigger, and resets a number counted by the counter circuit when the verification circuit detects the return pulse sent back from the receiving unit; and an additional pulse generating circuit for generating the additional pulse when the counter circuit counts a predetermined number or more.

5. The isolated communication system according to claim 1, wherein:

the edge pulse generating circuit includes a first pulse generating circuit for generating a first pulse corresponding to a transition of the digital input signal from the first level to the second level and a second pulse generating circuit for generating a second pulse corresponding to a transition of the digital input signal from the second level to the first level, the isolated communication unit includes a first isolated communication unit for transmitting the first pulse generated by the first pulse generating circuit to the receiving unit, and a second isolated communication unit for transmitting the second pulse generated by the second pulse generating circuit to the receiving unit, the transmission unit and the receiving unit are configured in such a manner that the first pulse transmitted from the first pulse generating circuit to the receiving unit via the first isolated communication unit is sent back as a first return pulse from the receiving unit to the transmission unit via the second isolated communication unit, and the second pulse transmitted from the second pulse generating circuit to the receiving unit via the second isolated communication unit is sent back as a second return pulse from the receiving unit to the transmission unit via the first isolated communication unit, the verification circuit includes a first verification circuit which determines whether or not the transmission unit has received the first return pulse sent back from the receiving unit and generates a first additional pulse when the verification circuit determines that the transmission unit has not received the first return pulse sent back from the receiving unit, and a second verification circuit which determines whether or not the transmission unit has received the second return pulse sent back from the receiving unit and generates a second additional pulse when the second verification circuit determines that the transmission unit has not received the second return pulse sent back from the receiving unit, and the transmission unit is configured to transmit the first pulse generated by the first pulse generating circuit and the first additional pulse generated by the first verification circuit to the receiving unit via the first isolated communication unit, and transmit the second pulse generated by the second pulse generating circuit and the second additional pulse generated by the second verification circuit to the receiving unit via the second isolated communication unit.

6. The isolated communication system according to claim 5, wherein:

the first verification circuit is configured to determine whether or not the transmission unit has received the first return pulse sent back from the receiving unit within a first predetermined time period, and the second verification circuit is configured to determine whether or not the transmission unit has received the second return pulse sent back from the receiving unit within a second predetermined time period.

7. The isolated communication system according to claim 6, wherein:

the first verification circuit is configured to generate the first additional pulse when the first verification circuit determines that the transmission unit has not received the first return pulse sent back from the receiving unit within the first predetermined time period, and the second verification circuit is configured to generate the second additional pulse when the second verification circuit determines that the transmission unit has not received the second return pulse sent back from the receiving unit within the second predetermined time period.

8. The isolated communication system according to claim 1, wherein the verification circuit is configured to determine whether or not the transmission unit has received the return pulse sent back from the receiving unit within a predetermined time period.

9. The isolated communication system according to claim 8, wherein the verification circuit is configured to generate the additional pulse when the verification circuit determines that the transmission unit has not received the return pulse sent back from the receiving unit within the predetermined time period.

10. A transmission unit comprising:

an edge pulse generating circuit configured to convert a digital input signal into a pulse corresponding to a transition of the digital input signal between a first level and a second level which is different from the first level; and a verification circuit configured to determine whether or not the transmission unit has received the pulse sent back as a return from a receiving unit, and generate an additional pulse when the verification circuit determines that the transmission unit has not received the return pulse sent back from the receiving unit, wherein the transmission unit is configured to transmit the pulse generated by the edge pulse generating circuit and the additional pulse generated by the verification circuit, to the receiving unit, via an isolated communication unit.

11. The transmission unit according to claim 10, wherein the verification circuit is configured to determine whether or not the transmission unit has received the return pulse from the receiving unit within a predetermined time period.

12. The transmission unit according to claim 11, wherein the verification circuit is configured to generate the additional pulse when the verification circuit determines that the transmission unit has not received the return pulse sent back from the receiving unit within the predetermined time period.

* * * * *